United States Patent
Feldtkeller

(10) Patent No.: US 11,128,211 B2
(45) Date of Patent: Sep. 21, 2021

(54) METHOD FOR DRIVING AN ELECTRONIC SWITCH IN A POWER CONVERTER CIRCUIT AND CONTROL CIRCUIT

(71) Applicant: Infineon Technologies Austria AG, Villach (AT)

(72) Inventor: Martin Feldtkeller, Munich (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/902,812

(22) Filed: Jun. 16, 2020

(65) Prior Publication Data
US 2021/0006147 A1    Jan. 7, 2021

(30) Foreign Application Priority Data
Jul. 2, 2019 (EP) ..................... 19183979

(51) Int. Cl.
*H02M 3/335* (2006.01)
*H02M 1/08* (2006.01)
*H02M 1/00* (2006.01)

(52) U.S. Cl.
CPC ....... *H02M 1/083* (2013.01); *H02M 3/33523* (2013.01); *H02M 1/0058* (2021.05)

(58) Field of Classification Search
CPC ............... H02M 1/083; H02M 1/0058; H02M 3/33523; H02M 1/42; H02M 3/335; H02M 1/00; H02M 1/4258; H02M 3/33522; H02M 2001/0058; H02M 1/4225; H02M 2001/0022
See application file for complete search history.

(56) References Cited

U.S. PATENT DOCUMENTS

| | | | | |
|---|---|---|---|---|
| 2014/0307485 | A1* | 10/2014 | Xu | H02M 3/33515 363/21.13 |
| 2017/0133939 | A1* | 5/2017 | Zhang | H02M 3/33523 |
| 2019/0036458 | A1* | 1/2019 | Shen | H02M 1/08 |
| 2020/0382005 | A1* | 12/2020 | Feldtkeller | H02M 3/33507 |
| 2020/0412232 | A1* | 12/2020 | Feldtkeller | H02M 1/08 |
| 2021/0013809 | A1* | 1/2021 | Chen | H02M 3/33523 |

OTHER PUBLICATIONS

Zhang J F, etal: "A novel multimode digital control approach for single-stage flyback power supplies with power factor correction and fast output voltage regulation", Applied Power Electronics Conference and Exposition, 2005. APEC 2005. Twentieth Annual IEEE D1 Austin, TX, USA Mar. 6-10, 2005, Piscataway, NJ, USA,IEEE, US, vol. 2, Mar. 6, 2005 (Mar. 6, 2005), pp. 830-836 vol. 2, XP010809332.
EP Search Report, EP 19 18 3979, dated Jan. 8, 2020, pp. 8.

* cited by examiner

*Primary Examiner* — Adolf D Berhane
(74) *Attorney, Agent, or Firm* — Armis IP Law, LLC

(57) ABSTRACT

A method and a control circuit for driving an electronic switch coupled to an inductor in a power converter in successive drive cycles each including an on-time and an off-time are disclosed. Driving the electronic switch includes: measuring an inductor voltage during the on-time in a drive cycle in order to obtain a first measurement value; measuring the inductor voltage during the off-time in a drive cycle in order to obtain a second measurement value; obtaining a first voltage measurement signal that is dependent on a sum of the first measurement value and the second measurement value; and adjusting the on-time in a successive drive cycle dependent on a feedback signal and the first voltage measurement signal.

13 Claims, 22 Drawing Sheets

METHOD FOR DRIVING AN ELECTRONIC SWITCH IN A POWER CONVERTER CIRCUIT AND CONTROL CIRCUIT

RELATED APPLICATION

This application claims priority to earlier filed European Patent Application Serial Number EP19183979 entitled "METHOD FOR DRIVING AN ELECTRONIC SWITCH IN A POWER CON-VERTER CIRCUIT AND CONTROL CIRCUIT," filed on Jul. 2, 2019, the entire teachings of which are incorporated herein by this reference.

BACKGROUND

Switched-mode power converter circuits are widely used to convert power in various kinds of electronic applications such as automotive, industrial, telecommunication, household or consumer electronic applications. A switched-mode power converter may include an electronic switch, an inductor coupled to the electronic switch, and a rectifier circuit coupled to the inductor. Converting power with a switched-mode power converter of this type usually includes receiving an input voltage and an input current at an input by the power converter and driving the electronic switch in a plurality of successive drive cycles each including an on-time and an off-time, wherein the inductor receives energy from the input during the on-time and transfers energy to the rectifier circuit during the off-time. An output parameter of the power converter, such as an output voltage or an output current, may be regulated by suitably adjusting durations of the on-times and the off-times.

BRIEF DESCRIPTION OF EMBODIMENTS

Some types of power converter circuits are configured to receive, as the input voltage, an alternating voltage or a rectified alternating voltage and, in addition to regulating the output parameter, are configured to regulate an input current such that an average input current in the individual drive cycles is essentially proportional to the input voltage. A power converter circuit of this type is usually referred to as PFC (Power Factor Correction) power converter, PFC converter, or PFC stage. A drive circuit configured to drive the electronic switch in a PFC converter is usually referred to as PFC controller.

There is a need for a simple and efficient method for driving an electronic switch in a PFC power converter, in particular a PFC converter in which input and output are galvanically isolated, and a drive circuit configured to implement this method.

One example relates to a method. The method includes driving an electronic switch coupled to an inductor in a power converter in successive drive cycles each including an on-time and an off-time, wherein the inductor is coupled to an auxiliary winding. Driving the electronic switch includes measuring an auxiliary voltage across the auxiliary winding during the on-time in a drive cycle in order to obtain a first measurement value, measuring the auxiliary voltage during the off-time in a drive cycle in order to obtain a second measurement value, obtaining a first voltage measurement signal that is dependent on a sum of the first measurement value and the second measurement value, and adjusting the on-time in a successive drive cycle dependent on a feedback signal and the first voltage measurement signal.

Another example relates to a control circuit configured to drive an electronic switch coupled to an inductor in a power converter in successive drive cycles, each including an on-time and an off-time. The control circuit is configured to measure an auxiliary voltage across an auxiliary winding coupled to the inductor during the on-time of a drive cycle in order to obtain a first measurement value, to measure the auxiliary voltage during the off-time of a drive cycle in order to obtain a second measurement value, to obtain a first voltage measurement signal that is dependent on a sum of the first measurement value and the second measurement value, and to adjust the on-time in a second drive cycle dependent on a feedback signal and the first voltage measurement signal.

Examples are explained below with reference to the drawings. The drawings serve to illustrate certain principles, so that only aspects necessary for understanding these principles are illustrated. The drawings are not to scale. In the drawings the same reference characters denote like features.

In the following detailed description, reference is made to the accompanying drawings. The drawings form a part of the description and for the purpose of illustration show examples of how the invention may be used and implemented. It is to be understood that the features of the various embodiments described herein may be combined with each other, unless specifically noted otherwise.

BRIEF DESCRIPTION AND DETAILED DESCRIPTION OF EMBODIMENTS

Figure 1:
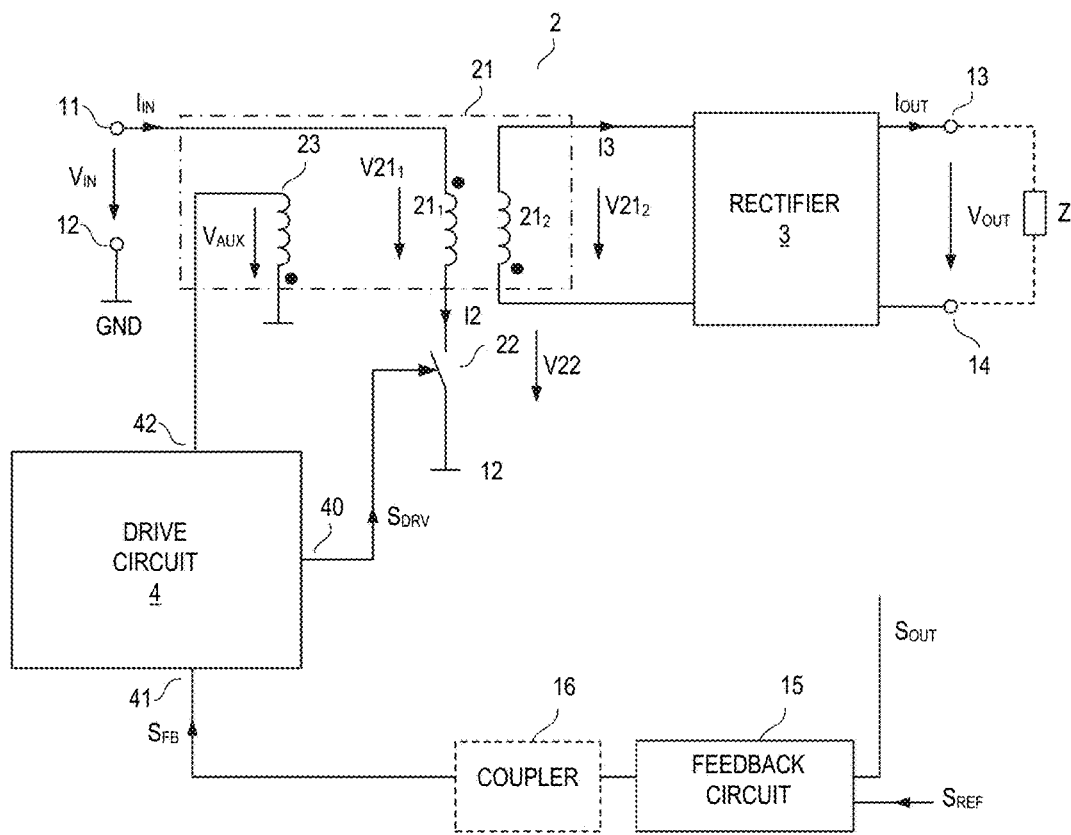
FIG. 1 illustrates one example of a power converter.

FIG. 1 illustrates one example of a power converter. This power converter includes an input 11, 12 configured to receive an input voltage $V_{IN}$ and an output 13, 14 configured to provide an output voltage $V_{OUT}$ and an output current $I_{OUT}$. The power converter may be configured to regulate an output parameter such as the output voltage $V_{OUT}$, the output current $I_{OUT}$, or an output power (which is given by the output voltage $V_{OUT}$ multiplied by the output current $I_{OUT}$) such that the output parameter has a predefined value.

Referring to FIG. 1, the power converter further includes a switching circuit 2 connected to the input 11, 12 and a rectifier circuit 3 connected between the switching circuit 2 and the output 13, 14. The switching circuit 2 includes an electronic switch 22 and an inductor 21 coupled to the electronic switch 22. The electronic switch 22 is controlled by a drive signal $S_{DRV}$ received at a drive input of the electronic switch 22 such that the electronic switch 22 switches on or off dependent on the drive signal $S_{DRV}$. Any type of electronic switch such as a MOSFET (Metal Oxide Semiconductor Field-Effect Transistor), an IGBT (Insulated Gate Bipolar Transistor), a HEMT (High Electron-Mobility Transistor), or the like may be used to implement the electronic switch 22.

Just for the purpose of illustration, the power converter shown in FIG. 1 is a flyback converter. In this case, the inductor 21 is a transformer with a primary winding $21_1$ and a secondary winding $21_2$, wherein the primary winding $21_1$ is connected in series with the electronic switch 22 and the series circuit including the primary winding $21_1$ and the electronic switch 22 is connected to the input 11, 12. That is, the series circuit including the primary winding $21_1$ and the electronic switch 22 is connected between a first input node 11 and a second input node 12 of the input 11, 12. The secondary winding $21_2$ is inductively coupled to the primary winding $21_1$ and is connected to the rectifier circuit 3. According to one example, a winding sense of the secondary winding $21_2$ is opposite to a winding sense of the primary winding $21_1$. In the power converter shown in FIG. 1, a current I2 through the primary winding $21_1$ of the transformer is controlled by a switched-mode operation of the electronic switch 22. This is explained in further detail herein below.

Optionally, the power converter further includes an auxiliary winding 23 of the transformer. This auxiliary winding 23 is inductively coupled to the primary winding $21_1$ and the secondary winding $21_2$. A voltage $V_{AUX}$ across the auxiliary winding 23 is referred to as auxiliary voltage in the following. The auxiliary voltage $V_{AUX}$ is essentially proportional to a voltage $V21_1$ across the primary winding $21_1$, wherein a proportionality factor between the auxiliary voltage $V_{AUX}$ and the voltage $V21_1$ across the primary winding $21_1$ is dependent on a ratio between a number of turns of the auxiliary winding 23 and a number of turns of the primary winding $21_1$. The voltage $V21_1$ across the primary winding is also referred to as inductor voltage or primary voltage in the following. According to one example, the auxiliary voltage $V_{AUX}$ is a voltage referenced to the second input node 12. This second input node 12 is also referred to as ground node GND in the following.

Referring to FIG. 1, the power converter further includes a feedback circuit 15. The feedback circuit 15 receives an output signal $S_{OUT}$ that represents the output parameter that is to be regulated. That is, the output signal $S_{OUT}$ may represent the output voltage $V_{OUT}$, the output current $I_{OUT}$, or the output power $P_{OUT}$. According to one example, the output signal $S_{OUT}$ represents the output voltage $V_{OUT}$ and is essentially proportional to the output voltage $V_{OUT}$. According to another example, the output signal $S_{OUT}$ represents the output current $I_{OUT}$ and is essentially proportional to the output current $I_{OUT}$. The output signal $S_{OUT}$ may be obtained by measuring the respective output parameter in a conventional way using any kind of voltage, current or power measurement circuit. Such circuits are commonly known so that no further explanations are required in this regard.

The feedback circuit 15 is configured to generate a feedback signal $S_{FB}$ based on the output signal $S_{OUT}$. The power converter further includes a drive circuit 4 that receives the feedback signal $S_{FB}$ at a first input 41 and is configured to generate the drive signal $S_{DRV}$ at an output 40 based on the feedback signal $S_{FB}$. Referring to FIG. 1, a load Z (illustrated in dashed lines) connected to the output 13, 14 may receive the output power provided by the power converter. Dependent on a power consumption of the load Z, the regulated output parameter, such as the output voltage $V_{OUT}$ or the output current $I_{OUT}$, may vary. The feedback circuit 15 is configured to generate the feedback signal $S_{FB}$ in such a way that the feedback signal $S_{FB}$—based on which the electronic switch 22 is driven—counteracts such variations of the regulated output parameter. More specifically, the feedback signal $S_{FB}$ is generated in such a way that, in a steady state of the power converter, an input power of the power converter, which is controlled by the switched-mode operation of the electronic switch 22, essentially equals the output power received by the load Z. The feedback circuit 15 and the drive circuit 4 form a control loop that is configured to regulate the output parameter.

Generating the feedback signal $S_{FB}$ by the feedback circuit 15 may include comparing the output signal $S_{OUT}$ with a reference signal $S_{REF}$, calculating an error signal based on comparing the output signal Sour with the reference signal $S_{REF}$, and generating the feedback signal $S_{FB}$ based on the error signal. The reference signal $S_{REF}$ represents a desired value of the output parameter. Generating the feedback signal $S_{FB}$ based on the error signal may include filtering the error signal using a filter with any one of a P (proportional) characteristic, an I (integrating) characteristic, a PI (proportional-integrating) characteristic or a PID (proportional-integrating-deriving) characteristic. Generating a feedback signal in a power converter based on an error signal is commonly known, so that no further explanation is required in this regard.

Referring to FIG. 1, a coupler 16 may be connected between the feedback circuit 15 and the drive circuit 4. Due to the transformer 21 there is a galvanic isolation between the input 11, 12 and the output 13, 14. The coupler 16 is configured to transmit the feedback signal $S_{FB}$ from the feedback circuit 51 via the galvanic isolation to the drive circuit 4. The coupler 16 may include an optocoupler, an inductive coupler, a capacitive coupler, or the like. In the example shown in FIG. 1, the coupler 16 is connected between the feedback circuit 15 and the drive circuit 4. In this case, the feedback circuit 15 is arranged on a secondary side of the power converter. This, however, is only an example. According to another example (not shown), the feedback circuit is arranged on the primary side and receives the auxiliary voltage $V_{AUX}$. The auxiliary voltage $V_{AUX}$ is essentially proportional to the output voltage $V_{OUT}$ when the switch is in the off-state. The latter is explained with reference to FIG. 3 herein below.

Figure 2:
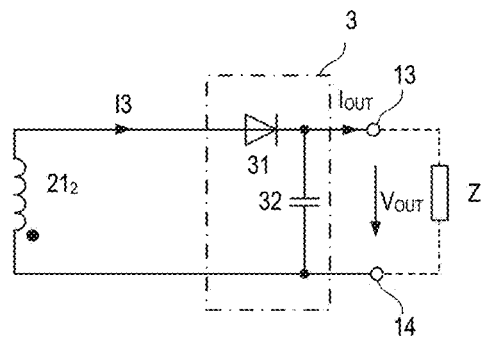
FIG. 2 illustrates one example of a rectifier circuit in the power converter according to FIG. 1.

The rectifier circuit 3 is configured to rectify a voltage $V21_2$ across the secondary winding $21_2$. The rectifier circuit 3 may be implemented in various ways. One example of the rectifier circuit 3 is illustrated in FIG. 2. In this example, the rectifier circuit 3 includes a series circuit with a rectifier element 31 and a capacitor 32 connected to the secondary winding $21_2$. The output voltage $V_{OUT}$ is a voltage across the capacitor 32 according to one example. The load Z that may be connected to the load may be any kind of load or load circuit. The load Z may include a further power converter that is configured to provide a voltage with a voltage level different from the voltage level of the output voltage $V_{OUT}$.

Operating the electronic switch 22 in a switched-mode fashion includes operating the electronic switch 22 in a plurality of successive drive cycles, wherein in each of these drive cycles the electronic switch 22 switches on for an on-time and switches off for an off-time. This is explained in further detail with reference to FIG. 3 below.

Figure 3:
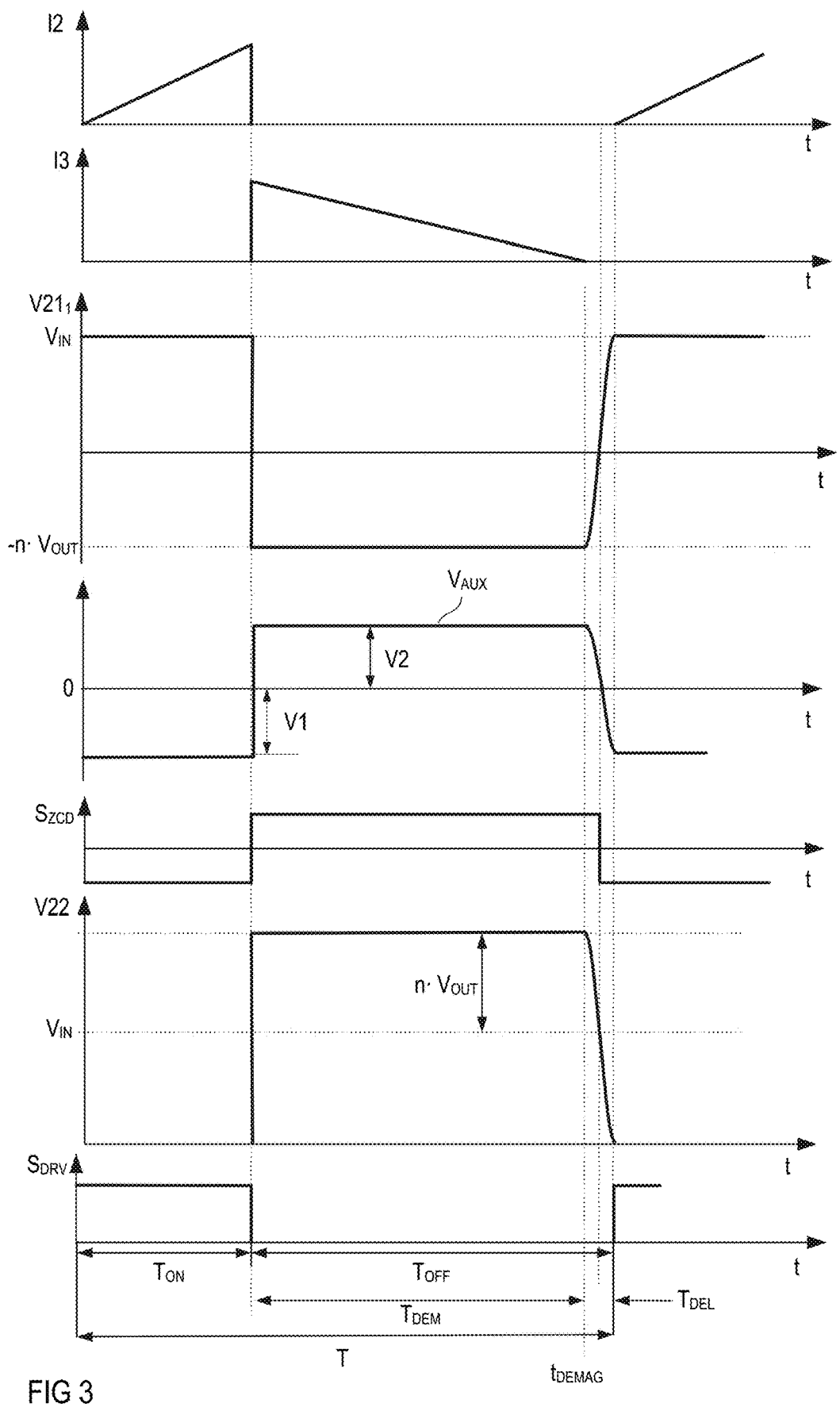
FIG. 3 shows signal diagrams that illustrate operating the power converter in a first operating mode.

FIG. 3 illustrates signal diagrams of the current I2 through the primary winding $21_1$ and the switch 22, a current I3 through the secondary winding $21_2$, a voltage $V21_1$ across the primary winding $21_1$, the auxiliary voltage $V_{AUX}$, a voltage V22 across the switch 22, and the drive signal $S_{DRV}$. In the following, the current I2 through the primary winding $21_1$ and the switch 22 is also referred to as primary current, the current I3 through the secondary winding $21_2$ is also referred to as secondary current, the voltage $V21_1$ across the primary winding $21_1$ is also referred to as primary voltage, and the voltage V22 across the switch 22 is also referred to as switch voltage. FIG. 3 illustrates operating the power converter in one drive cycle. A duration T of this drive cycle is given by a duration $T_{ON}$ of an on-time plus a duration $T_{OFF}$ of an off-time. The "on-time" is the time period in which the electronic switch 22 is switched on, and the "off-time is the time period in which the electronic switch 22 is switched off. The electronic switch 22 switches on when the drive signal $S_{DRV}$ has an on-level and switches off when the drive signal $S_{DRV}$ has an off-level. Just for the purpose of illustration, the on-level is a high signal level and the off-level is a low signal level in the example illustrated in FIG. 3.

Referring to FIG. 3, the primary current I2 increases during the on-time (wherein an increase of the primary current I2 is essentially proportional to the input voltage $V_{IN}$ and inversely proportional to an inductance of the transformer 21). Further, during the on-time, the secondary current I3 is zero, the primary voltage $V21_1$ essentially equals the input voltage $V_{IN}$, and the switch voltage V22 is essentially zero. In the example illustrated in FIG. 1, the winding sense of the auxiliary voltage $V_{AUX}$ is such that the auxiliary voltage $V_{AUX}$ is negative during the on-time. Referring to the above, a magnitude of the auxiliary voltage $V_{AUX}$ is proportional to a magnitude of the primary voltage $V21_1$. Thus, during the on-time, a magnitude V1 of the auxiliary voltage $V_{AUX}$ is proportional to the input voltage $V_{IN}$.

Referring to FIG. 3, when the switch 22 switches off, the primary current I2 becomes zero and the secondary current I3 jumps to an initial value from which it gradually decreases. The primary voltage $V21_1$ and, equivalently, the auxiliary voltage $V_{AUX}$ change their polarity. The magnitude of the primary voltage $V21_1$ is essentially given by $n \cdot V_{OUT}$, wherein n is given by a ratio between a number $N_1$ of turns of the primary winding $21_1$ and a number of turns $N_2$ of the secondary winding $21_2$ ($n=N_1/N_2$). During the off-time, a magnitude V2 of the auxiliary voltage $V_{AUX}$ is again proportional to the primary voltage $V21_1$, so that during the off-time the magnitude V2 of the auxiliary voltage $V_{AUX}$ is proportional to the output voltage $V_{OUT}$. The proportionality factor between the auxiliary voltage $V_{AUX}$ and the primary voltage $V21_1$ is the same during the on-time and during the off-time. Further, during the off-time, the switch voltage V22 essentially equals the input voltage $V_{IN}$ plus the magnitude of the primary voltage $V21_1$. It should be noted that the primary voltage $V21_1$ is not exactly proportional to the output voltage $V_{OUT}$, but is proportional to the output voltage $V_{OUT}$ plus a voltage across the rectifier circuit 3, wherein the voltage across the rectifier circuit 3 decreases as the transformer is demagnetized. This voltage across the rectifier circuit 3, however, is negligible as compared to the output voltage $V_{OUT}$, so that the primary voltage $V21_1$ can be considered to be proportional to the output voltage $V_{OUT}$ during the off-time.

During the on-time, energy is magnetically stored in the transformer 21 and, during the off-time, this energy is transferred from the transformer 21 via the rectifier circuit 3 to the output 13, 14. Storing energy in the transformer 21 is associated with magnetizing the transformer and transferring the energy from the transformer 21 to the output 13, 14 is associated with demagnetizing the transformer. In the example illustrated in FIG. 3, the off-time is long enough for the transformer 21 to be completely demagnetized. When the transformer is completely demagnetized, the (negative) primary voltage $V21_1$ increases and the (positive) auxiliary voltage $V_{AUX}$ decreases. In the example shown in FIG. 3, the electronic switch 22 again switches on when the auxiliary voltage $V_{AUX}$ crosses zero or shortly after the auxiliary voltage $V_{AUX}$ crosses zero. This kind of operating mode of the power converter is referred to as first operating mode or quasi-resonant mode in the following. In this type of operating mode the duration T of one drive cycle is dependent on the duration $T_{ON}$ of the on-time and the duration $T_{OFF}$ of the off-time, wherein the duration of the off-time increases as the duration of the on-time increases and wherein, for a given duration of the on-time, the duration of the off-time increases as the input voltage $V_{IN}$ increases.

In FIG. 3, $t_{DEMAG}$ denotes a demagnetization time instance, which is a time instance when the transformer 21 has been completely demagnetized. The proportionality explained above between the primary voltage $V21_1$ and the output voltage $V_{OUT}$ is given in a time period $T_{DEM}$ between the beginning of the off-time and the demagnetization time instance $t_{DEMAG}$. This time period $T_{DEM}$ is also referred to as demagnetization time period in the following.

Figure 4:
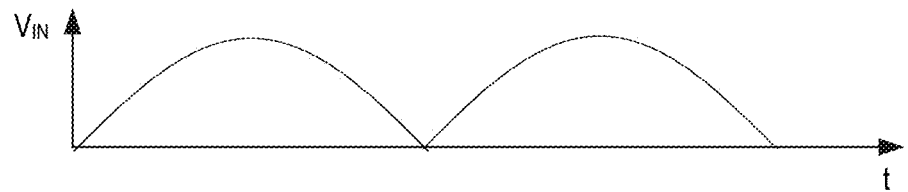
FIG. 4 illustrates one example of an input voltage that may be received by the power converter according to FIG. 1.

According to one example, the input voltage $V_{IN}$ is a rectified alternating voltage such as a rectified sinusoidal voltage illustrated in FIG. 4. A rectified sinusoidal voltage may be generated by a bridge rectifier (not illustrated in the drawings) from a sinusoidal grid voltage, for example.

In many different applications of a power converter of the type shown in FIG. 1 it is desired not only to control the output parameter such that it essentially equals a desired value, but it is also to control the input current $I_{IN}$, which is the current I2 through the primary winding $21_2$ and the switch 22 in the example shown in FIG. 1, such that an average of the input current $I_{IN}$ follows the signal waveform of the input voltage $V_{IN}$. That is, it is desirable to control the input current $I_{IN}$ such that in each drive cycle the average of the input current $I_{IN}$ is essentially proportional to an instantaneous value of the input voltage $V_{IN}$, wherein a proportionality factor between the average of the input current $I_{IN}$ and the input voltage $V_{IN}$ may vary dependent on the power consumption of the load Z. A power converter having this functionality is often referred to as PFC (Power Factor Correction) converter. The average of the input current $I_{IN}$ is also referred to as average input current $I_{IN\_AVG}$ in the following.

It should be noted that the power received by the power converter from the input is proportional to a square of the input voltage. When the input voltage $V_{IN}$ is a sinusoidal voltage, for example, the input power received by the power converter has a sine square waveform, wherein an amplitude of this sine square waveform is dependent on a power consumption of the load. At least one capacitor of the rectifier circuit 3, such as capacitor 32 in FIG. 2, ensures that an essentially constant output voltage $V_{OUT}$ and an essentially constant output current $I_{OUT}$ can be provided. Nevertheless, the output voltage $V_{OUT}$ might not be exactly constant but may include a periodic voltage ripple with a frequency that is given by twice the frequency of the input voltage $V_{IN}$. This voltage ripple is due to the variation of the input power that occurs when the average input current $I_{IN\_AVG}$ is proportional to the input voltage $V_{IN}$. The feedback circuit 15 may be configured to filter out these ripples so that they do not negatively affect the control loop. Filtering out these ripples may include using a notch filter or using an integrating filter with a relatively long an integrating window.

Figure 5:
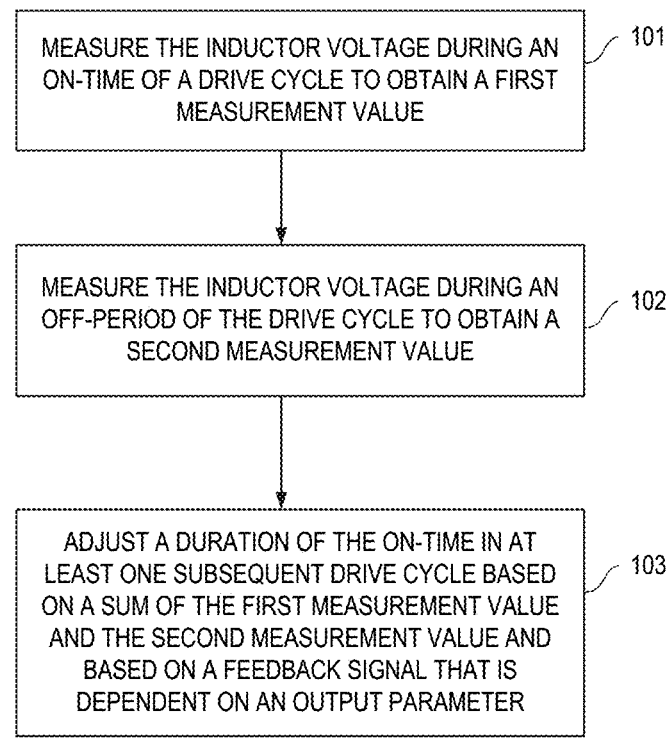
FIG. 5 is a flowchart that illustrates operating the power converter in the first operating mode.

FIG. 5 shows a flowchart of a method that is configured to control operation of the power converter such that both regulating the output parameter and regulating the waveform of the average input current $I_{IN\_AVG}$ is achieved in a rather simple way. Referring to FIG. 5, the method includes measuring the inductor voltage during the on-time in one drive cycle in order to obtain a first measurement value (101), measuring the inductor voltage during the off-time in one drive cycle in order to obtain a second measurement value (102), and adjusting a duration of the on-time in at least one subsequent drive cycle based on a sum of the first measurement value and the second measurement value and based on the feedback signal (103). The inductor voltage is the voltage $V21_1$ across the primary winding, that is the primary voltage according to one example. According to one example, obtaining the first measurement value and the second measurement value includes obtaining the first measurement value such that it is proportional to the inductor voltage during the on-time and obtaining the second measurement value such that it is proportional to the magnitude of the inductor voltage during the off-time.

According to one example, the inductor voltage is either the primary voltage $V21_1$ or the secondary voltage $V21_2$ and measuring the inductor voltage $V21_1$ includes measuring that auxiliary voltage $V_{AUX}$ which, as explained above, is proportional to the primary voltage $V21_1$ (and the secondary voltage $V21_2$). In this case, obtaining the first measurement value and the second measurement value includes obtaining the first measurement value such that it is proportional to the magnitude V1 of the auxiliary voltage $V_{AUX}$ during the on-time and obtaining the second measurement value such that it is proportional to the magnitude V2 of the auxiliary voltage $V_{AUX}$ during the off-time. The magnitudes V1, V2 of auxiliary voltage $V_{AUX}$ during the on-time and the off-time are also illustrated in FIG. 3. Obtaining the second measurement value during the off-time may include obtaining the second measurement value between the beginning of the off-time and the demagnetization time instance $t_{DEMAG}$, that is, during a time period in which the inductor voltage is essentially proportional to the output voltage $V_{OUT}$.

In the examples explained below, measuring the inductor voltage includes measuring the auxiliary voltage $V_{AUX}$. This, however, is only an example. The inductor voltage may be measured in any other way as well, such as by measuring the input voltage $V_{IN}$ and the switch voltage V22 and calculating a difference.

Referring to the above, the auxiliary voltage $V_{AUX}$ is proportional to the input voltage $V_{IN}$ during the on-time and proportional to the output voltage $V_{OUT}$ during the off-time. It can be assumed that the input voltage $V_{IN}$ and the output voltage $V_{OUT}$ change slowly and can be considered to be essentially constant over several drive cycles of the drive signal. Thus, the first measurement value and the second measurement value may be obtained in the same drive cycle. However, it is also possible to obtain the first measurement value and the second measurement value in different drive cycles. Further, "adjusting a duration of the on-time in at least one subsequent drive cycle" (a) may include using the sum of a first measurement value and a second measurement value to adjust the on-time in only one drive cycle before obtaining new first and second measurement values, (b) or may include using the sum of a first measurement value and a second measurement value to adjust the on-time in several successive drive cycles before obtaining new first and second measurement values. It is even possible to obtain one first measurement value based on measurements in several drive cycles and to obtain one second measurement value based on measurements in several drive cycles. Obtaining one first or second measurement value based on measurements in several drive cycles may include forming an average of measurement values obtained by the measurements.

Figure 6:
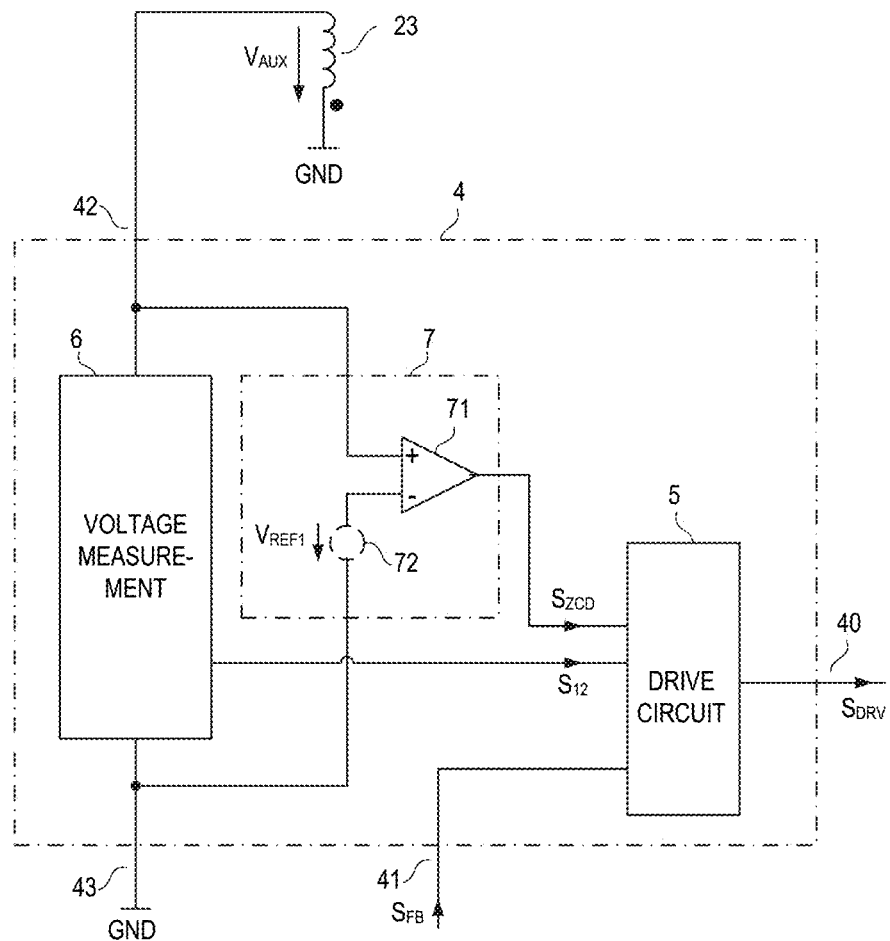
FIG. 6 illustrates one example of a control circuit configured to control operation of the power converter and drive an electronic switch in the power converter.

One example of a control circuit 4 configured to operate the power converter in a method according to FIG. 5 is illustrated in FIG. 6. This control circuit 4 includes a drive circuit 5 that is configured to generate the drive signal $S_{DRV}$, a voltage measurement circuit 6 that is configured to measure the auxiliary voltage $V_{AUX}$, and a crossing detection circuit 7 that is configured to detect time instances when the auxiliary voltage $V_{AUX}$ crosses a predefined voltage level.

Referring to FIG. 6, the crossing detection circuit 7 includes a comparator 71 that is configured to compare the auxiliary voltage $V_{AUX}$ with a reference voltage $V_{REF1}$ provided by a reference voltage source 72. An output signal $S_{ZCD}$ of the comparator 71 is dependent on whether the auxiliary voltage $V_{AUX}$ is higher or lower than the reference voltage $V_{REF1}$. According to one example, the reference voltage is zero. In this example, the reference voltage source 72 may be omitted and the comparator output signal $S_{ZCD}$ indicates whether the auxiliary voltage $V_{AUX}$ is higher or lower than zero. Independent of whether the reference voltage $V_{REF1}$ is zero or different from zero, the comparator output signal $S_{ZCD}$ will be referred to as zero crossing detection (ZCD) signal in this case. Referring to FIG. 3, in which the zero crossing detection signal $S_{ZCD}$ is also illustrated, the zero crossing detection signal $S_{ZCD}$ indicates the time instances when the auxiliary voltage $V_{AUX}$ crosses the reference voltage $V_{REF1}$.

After the demagnetization time instance $t_{DEMAG}$, the primary voltage $V21_1$ increases and the auxiliary voltage $V_{AUX}$ decreases, so that the auxiliary voltage $V_{AUX}$ crosses the reference voltage $V_{REF1}$ for the first time, Thus, the zero crossing detection signal $S_{ZCD}$, which is generated based on comparing the auxiliary voltage $V_{AUX}$ with the reference voltage $V_{REF1}$, indicates when the transformer 21 has been completely demagnetized during the off-time.

The voltage measurement circuit 6 is configured to measure the auxiliary voltage $V_{AUX}$ in the on-time in order to obtain the first measurement value representing the magnitude V1 and during the off-time in order to obtain the second measurement value representing the magnitude V2. Further, the voltage measurement circuit 6 is configured to output a voltage measurement signal $S_{12}$ that represents the sum of the two magnitudes V1, V2, that is, the output signal $S_{12}$ is proportional to V1+V2. The drive circuit 5 receives the ZCD signal $S_{ZCD}$, the voltage measurement signal $S_{12}$ and the feedback signal $S_{FB}$ and generates the drive signal $S_{DRV}$ based on these signals $S_{ZCD}$, $S_{12}$, $S_{FB}$. One example of the drive circuit 5 is illustrated in FIG. 7.

Figure 7:
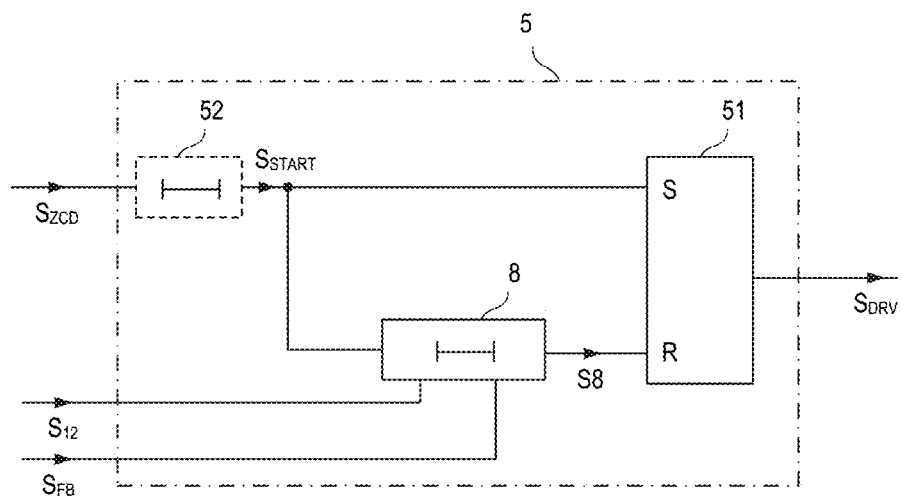
FIG. 7 illustrates one example of a drive circuit in the control circuit shown in FIG. 6.

The drive circuit 5 shown in FIG. 7 includes a latch 51, wherein the latch 51 provides the drive signal $S_{DRV}$. Optionally, a driver (not illustrated) is connected between the latch 51 and the switch 22 and is configured to generate the drive signal $S_{DRV}$ suitable for driving the switch 22 based on an output signal of the latch 51. The latch 51 receives an on-time start signal $S_{START}$ and an on-time end signal S8 and is configured to generate the on-level of the drive signal $S_{DRV}$ dependent on the on-time start signal and the on-time end signal S8. The on-time start signal $S_{START}$ is briefly referred to as start signal and the on-time end signal is briefly referred to as end signal in the following.

Just for the purpose of illustration, the latch 51 is an SR-flip-flop in the example shown in FIG. 7 and receives the start signal $S_{START}$ at a set input S and the end signal S8 at a reset input R. According to one example, the start signal $S_{START}$ is the zero crossing detection signal $S_{ZCD}$ and the latch 51 is configured to generate the on-level of the drive signal $S_{DRV}$ when the zero crossing detection signal $S_{ZCD}$ indicates that the transformer has been completely demagnetized. In the example explained before, a falling edge of the zero crossing detection signal $S_{ZCD}$ during the off-time indicates that the transformer 21 has been completely demagnetized, so that latch 51 may start generating the on-level of the drive signal $S_{DRV}$ when a falling edge of the start signal $S_{START}$ occurs.

Optionally, the start signal $S_{START}$ is not the zero crossing detection signal $S_{ZCD}$, but a delayed version of the zero crossing detection signal $S_{ZCD}$ provided by a delay element 52. In some cases it may be desirable not to switch on when the auxiliary voltage $V_{AUX}$ crosses zero, but shortly after the auxiliary voltage $V_{AUX}$ has crossed zero. This is illustrated in FIG. 3. As can be seen from FIG. 3, the switch voltage V22 further decreases after the auxiliary voltage $V_{AUX}$ has crossed zero. By switching on the electronic switch 22 after the auxiliary voltage $V_{AUX}$ has crossed zero, switching losses that may occur in the switch 22 can be reduced. After the transformer 21 has been completely demagnetized, parasitic oscillations may occur. This is explained in further detail herein below.

Basically, switching losses in the electronic switch 22 can be reduced when detecting the time instance at which the transformer has been completely demagnetized and when switching on after a delay time that essentially equals one half (50%) of the duration of one period of the parasitic oscillations. After this delay time, the voltage V22 across the switch 22 has reached a local minimum, which is often referred to as valley. In the quasi-resonant mode illustrated in FIG. 3, the switch 22 switches when the switch voltage V22 has reached the first valley after the demagnetization time instance $t_{DEMAG}$. The duration of one period of the parasitic oscillations, which results from an inductance of the transformer 21 and parasitic capacitors, such as an output capacitance of the switch 22, can be obtained by measurements or simulations. Referring to FIG. 3, the transformer 21 is completely demagnetized when the primary voltage $V21_1$ starts to increase and the auxiliary voltage $V_{AUX}$ starts to decrease. A first zero crossing of the auxiliary voltage $V_{AUX}$ occurs one quarter (25%) of one period of the parasitic oscillations after the transformer 21 has been completely demagnetized, so that switching on the switch 22 one half period of the oscillations after the transformer 21 has been completely demagnetized is equivalent to switching on the electronic switch 22 one quarter of one period of the oscillations after the auxiliary voltage $V_{AUX}$ has crossed zero. According to one example, a delay time of the delay element 52 shown in FIG. 7 essentially equals one quarter of a period of the parasitic oscillations in order to achieve switching on when the voltage V22 across the switch 22 has reached a local minimum (valley).

Referring to FIG. 7, the end signal S8 is provided by an on-time control circuit 8, wherein the on-time control circuit 8 receives the start signal $S_{START}$, the feedback signal $S_{FB}$, and the voltage measurement signal $S_{12}$. The on-time control circuit 8 controls the duration of the on-time and causes the latch 51 to generate the off-level of the drive signal $S_{DRV}$ after a time period defined by the on-time control circuit 8, wherein this time period is dependent on the voltage measurement signal $S_{12}$ and the feedback signal $S_{FB}$. One example of the on-time control circuit 8 is illustrated in FIG. 8.

The on-time control circuit 8 illustrated in FIG. 8 includes a ramp signal generator 83 that receives the start signal $S_{START}$ and is configured to output a ramp signal $S_{RAMP}$, a multiplier 82 that receives the feedback signal $S_{FB}$ and the voltage measurement signal $S_{12}$, and a comparator 81 that receives the ramp signal $S_{RAMP}$ and a multiplier output signal S82, which is also referred to as reference signal in the following. The end signal S8 is available at an output of the comparator 81.

Figure 8:
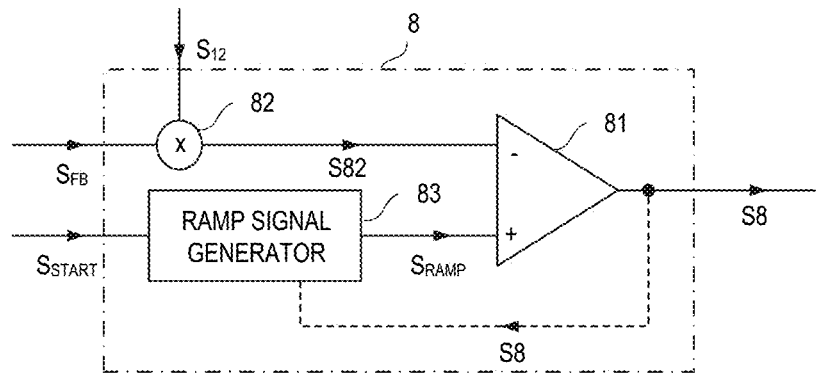
FIG. 8 illustrates one example of an on-time control circuit in the drive circuit.
Figure 9:
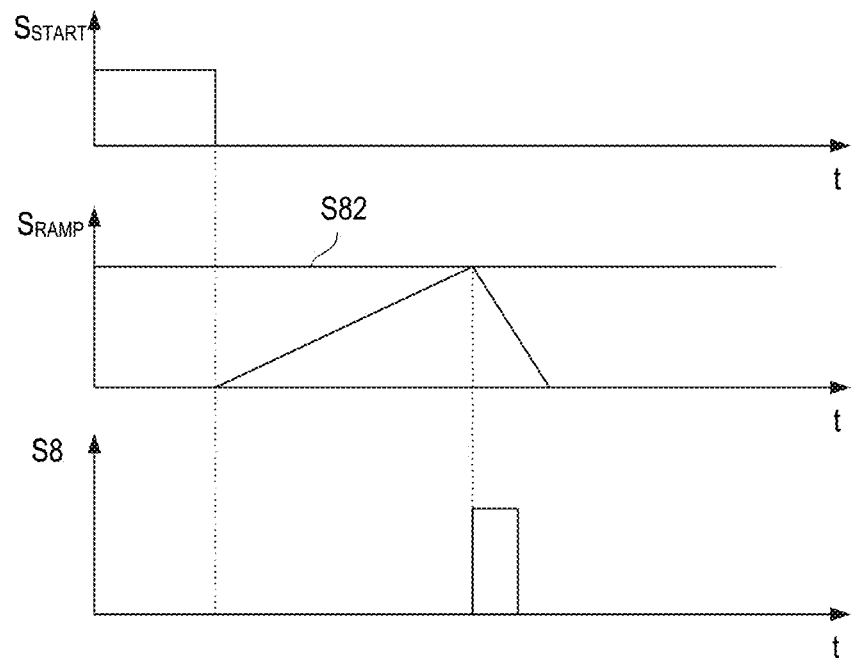
FIG. 9 shows signal diagrams that illustrate the function of the on-time control circuit shown in FIG. 8.

FIG. 9 shows signal diagrams that illustrate the functionality of the on-time control circuit 8 shown in FIG. 8. Referring to FIG. 9, the ramp signal generator 83 is configured to start a new ramp each time the start signal $S_{START}$ has a certain edge that causes the latch (51 in FIG. 7) to start the on-time. Just for the purpose of illustration, this edge of the start signal $S_{START}$ is a falling edge in the example shown in FIG. 9. A predefined edge of the end signal S8 is generated when a signal level of the ramp signal $S_{RAMP}$ reaches a signal level of an output signal S82 of the multiplier. The predefined edge of the end signal S8 causes the latch (51 in FIG. 7) to end the on-time, that is, to change the signal level of the drive signal from the on-level to the off-level. Just for the purpose of illustration, the predefined edge of the end signal S8 that causes the end of the on-time is a rising edge in the example illustrated in FIG. 9.

Referring to FIG. 8, the ramp signal generator 83 may receive the end signal S8 in order to reset the ramp signal $S_{RAMP}$ to a start level, wherein the start level is the signal level from which the ramp signal $S_{RAMP}$ again starts to increase when the start signal $S_{START}$ indicates the beginning of a new on-time.

In the on-time control circuit 8 illustrated in FIG. 8, a time period between a time instance at which the predefined edge of the start signal $S_{START}$ is received and the time instance at which the predefined edge of the end signal S8 is generated is proportional to the multiplier output signal S82. The multiplier output signal S82, however, is proportional to the voltage measurement signal $S_{12}$. Thus, for a given feedback signal $S_{FB}$ this time duration increases or decreases proportionally to the voltage measurement signal $S_{12}$. This time duration equals the duration $T_{ON}$ of the on-time.

Figure 10:
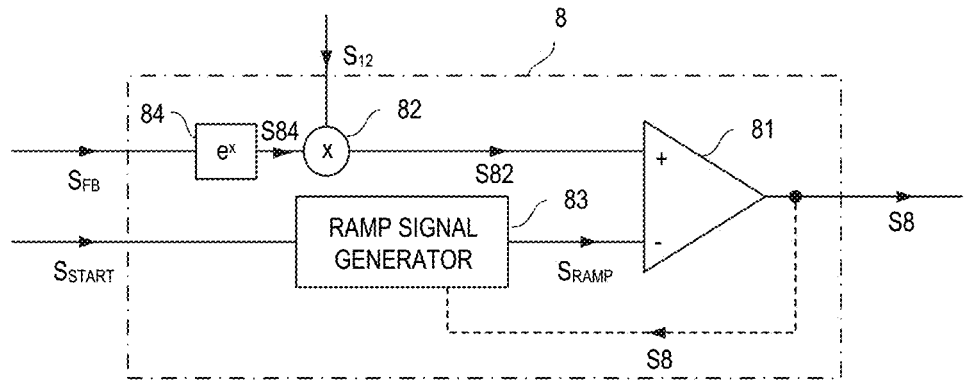
FIG. 10 illustrates another example of an on-time control circuit.

FIG. 10 illustrates a modification of the on-time control circuit 8 shown in FIG. 8. The on-time control circuit 8 shown in FIG. 10 additionally includes a function generator 84 that receives the feedback signal $S_{FB}$ and outputs a signal that is exponentially dependent on the feedback signal $S_{FB}$. The multiplier 82 receives a function generator output signal S84 in this example. Using a signal that is exponentially dependent on the feedback signal $S_{FB}$ instead of the feedback signal $S_{FB}$ is basically known and, for example, disclosed in DE 197 25 842 A1. Thus, no further explanation is required in this regard. The on-time controlled by the variable on-time control circuit 8 shown in FIG. 10 is proportional to the voltage measurement signal $S_{12}$ and proportional to $e^{S_{FB}}$, wherein e is Euler's number.

Figure 11:
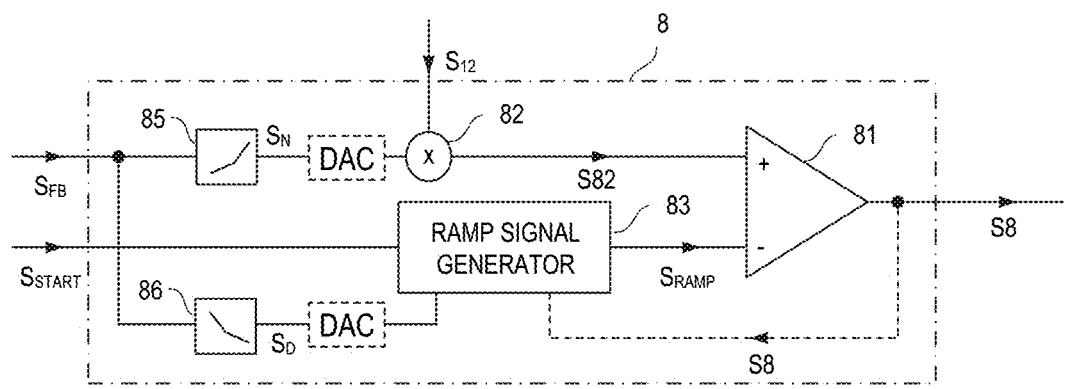
FIG. 11 illustrates yet another example of an on-time control circuit.

Instead of using the signal generator 84 shown in FIG. 10, which calculates $e^{S_{FB}}$, two signal generators (function generators) 85, 86 may be implemented, as illustrated in FIG. 11. A first one 85 of these signal generators 85, 86 generates a first output signal $S_N$ that is dependent on the feedback signal $S_{FB}$ such that the first output signal $S_N$ increases as the feedback signal $S_{FB}$ increases. This first function generator output signal $S_N$ is received by the multiplier 82. A second one 86 of the function generators is configured to generate a second output signal $S_D$ such that the second output signal $S_D$ decreases as the feedback signal $S_{FB}$ increases. This second output signal $S_D$ is received by the ramp signal generator 83 and is configured to adjust a slope of the ramp signal $S_{RAMP}$. One example of this ramp signal generator 83 is illustrated in FIG. 12.

Figure 12:
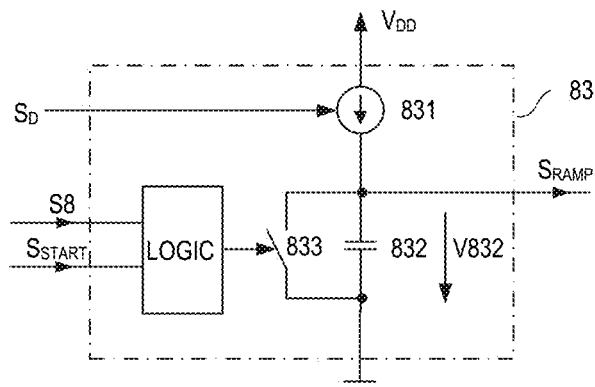
FIG. 12 illustrates one example of a ramp signal generator.

The ramp signal generator 83 according to FIG. 12 includes a current source 831 and a capacitor 832 connected in series with the current source 831. The current source 831 is controlled by the second function generator signal $S_D$ such that a current I831 of the current source 831 increases as the function generator signal $S_D$ increases and decreases as the function generator signal $S_D$ decreases. According to one example, the current I831 is essentially proportional to the function generator signal $S_D$. A voltage V832 across the capacitor 832 forms the ramp signal $S_{RAMP}$ in this ramp signal generator 83. A switch 833 connected in parallel with the capacitor 832 is controlled by a logic 834 dependent on the start signal $S_{START}$ and the end signal S8. According to one example, the logic 834 is configured to reset the ramp signal $S_{RAMP}$ by closing the switch 833 each time the end signal S8 indicates that the end of the on-time has been reached. Further, the logic is configured to start a new ramp of the ramp signal $S_{RAMP}$ by opening the switch 933 when the start signal $S_{START}$ indicates that the on-time of a new drive cycle has started.

The function generators 85, 86 can be digital function generators, wherein the ramp signal generator 83 and the comparator may be implemented using analog circuits. In this case, digital-to-analog converters (DACs) may be connected downstream the signal generators 85, 86. According to one example, the multiplier 82 may be implemented as multiplying DAC, so that DAC and multiplier is implemented by the same circuit.

Figure 13:
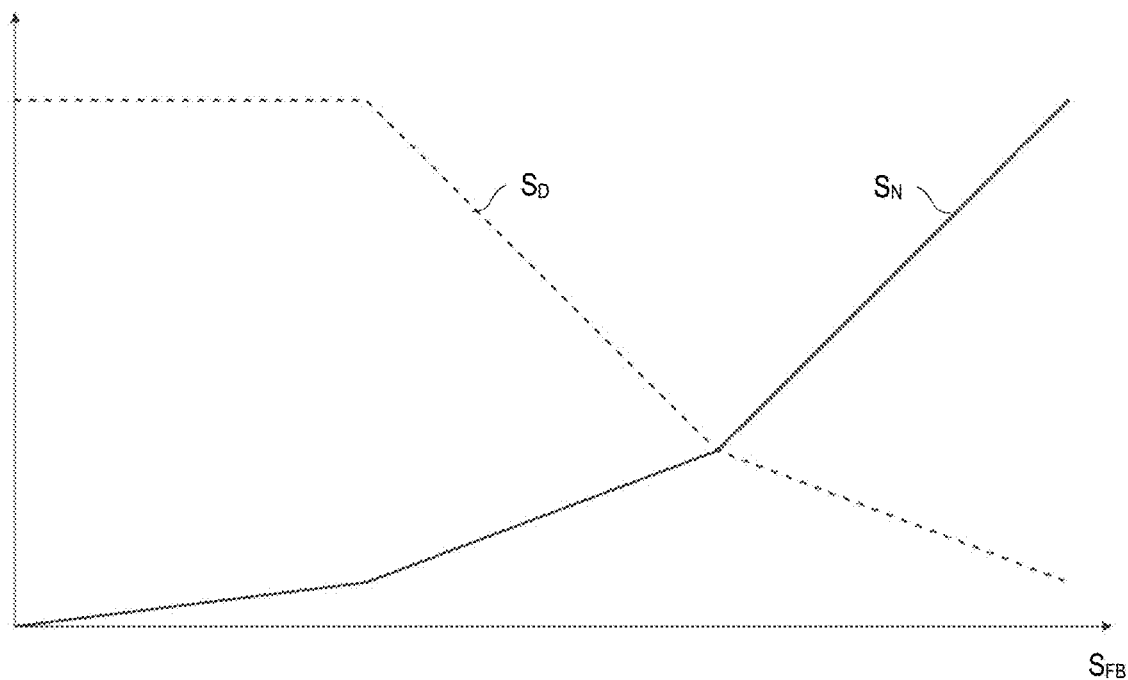
FIG. 13 show signal diagrams that illustrate the functionality of function generators in the on-time control circuit according to FIG. 11.

FIG. 13 illustrates one example of the first signal generator output signal $S_N$ and the second signal generator output signal $S_D$. Referring to FIG. 13, each of these signals may be a piecewise linear signal, wherein the first signal $S_N$ increases as the feedback signal $S_{FB}$ increases, wherein slopes of the piecewise linear sections (a.k.a., portions) increase as the feedback signal $S_{FB}$ increases. The second signal $S_D$ decreases as the feedback signal $S_{FB}$ decreases, wherein a slope of this second signal $S_D$ at first increases and then decreases. By implementing the on-time control circuit 8 in accordance with the examples illustrated in FIGS. 11, 12 and 13, the duration of the on-time is proportional to the voltage measurement signal $S_{12}$ and approximately proportional to $e^{S_{FB}}$.

Referring to the above, the voltage measurement circuit 6 measures the auxiliary voltage $V_{AUX}$ during the on-time and the off-time in one or more drive cycles and is configured to output the voltage measurement signal $S_{12}$ such that it is proportional to the sum of the magnitudes V1, V2 of the auxiliary voltage $V_{AUX}$ during the on-time and the off-time.

Figure 14:
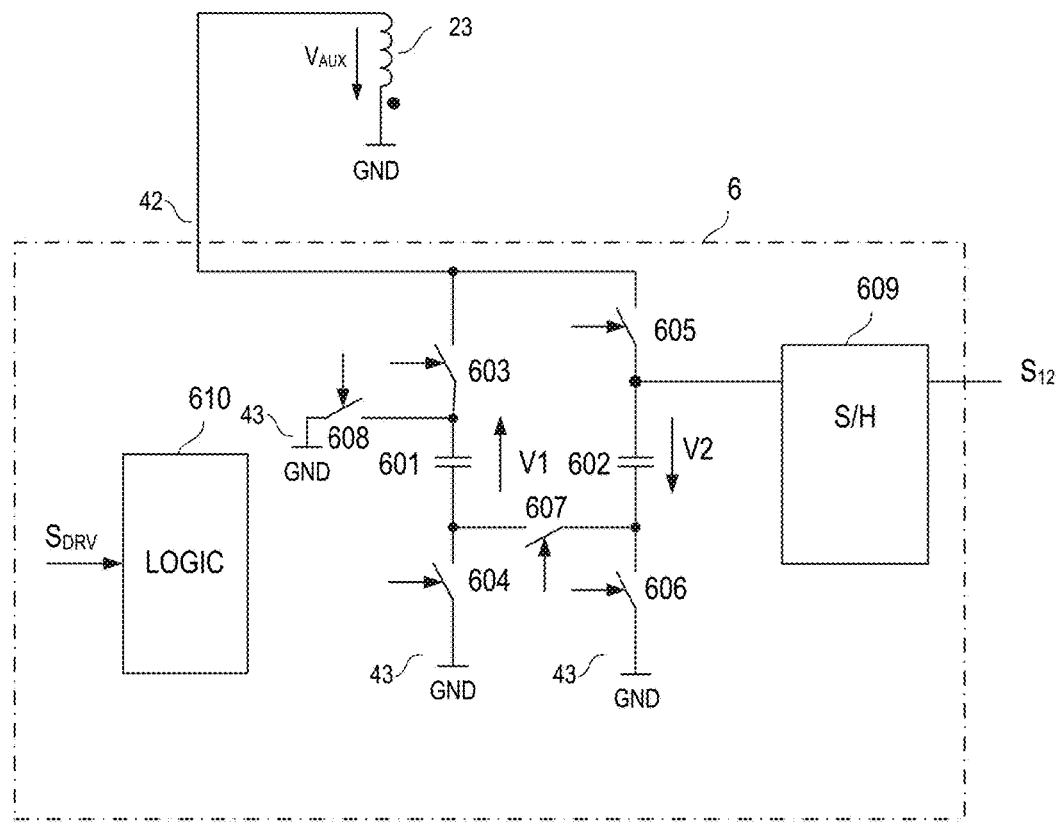
FIG. 14 shows one example of a voltage measurement circuit.

One example of the voltage measurement circuit 6 is illustrated in FIG. 14. This voltage measurement circuit 6 includes a first capacitor 601 connected in series with a first switch 603 and a second switch 604, and a second capacitor 602 connected in series with a third switch 605 and a fourth switch 606, a fifth switch 607 connected between the first and second capacitors 601, 602, a sixth switch 608 connected to the first capacitor 602, a sample-and-hold (S/H) circuit 609 coupled to the second capacitor 602, and a logic 610 configured to control operation of the switches 603-608 and the S/H-circuit 609. A first series circuit including the first capacitor 601 and the first and second switches 603, 604 and a second series circuit including the second capacitor 602 and the third and fourth switches 605, 606 are each connected between an auxiliary voltage input 42 and a ground input 43 of the control circuit 4. At the auxiliary voltage input 42, the control circuit 4 is connected to the auxiliary winding 23, and the ground input 43 is connected to the ground node GND, so that the auxiliary voltage $V_{AUX}$ is available between the auxiliary voltage input 42 and the ground input 43.

The logic 610 is configured to receive the drive signal $S_{DRV}$ and is configured to control the first and second switch 603, 604 such that the first capacitor 601 is connected between auxiliary voltage input 42 and the ground input 43 for a first time period during the on-time so that at the end of this time period a voltage across the first capacitor 601 equals the magnitude V1 of the auxiliary voltage $V_{AUX}$ during the on-time. Referring to the above, the auxiliary voltage $V_{AUX}$ is negative during the on-time, so that, after the first time period, a potential at a first capacitor node, which is the capacitor node connected to the auxiliary voltage input 42 by the first switch 603 during the first time period, is negative relative to a potential at a second capacitor node, which is the capacitor node connected to the second electronic switch 604.

Further, the logic 609 is configured to control the third and fourth switch 605, 606 such that the second capacitor 602 is connected between auxiliary voltage input 42 and the ground input 43 for a second time period during the off-time so that at the end of this second time period a voltage across the second capacitor 602 equals the magnitude V2 of the auxiliary voltage $V_{AUX}$ during the off-time. Referring to the above, the auxiliary voltage $V_{AUX}$ is positive during the off-time, so that, after the second time period, a potential at a first capacitor node, which is the capacitor node connected to the auxiliary voltage input 42 by the third switch 605 during the second time period, is positive relative to a potential at a second capacitor node, which is the capacitor node connected to the fourth electronic switch 604.

Referring to FIG. 14, the fifth switch 607 is connected between the second capacitor node of the first capacitor 601 and the second capacitor node of the second capacitor 602 and the sixth switch is connected between the first capacitor node of the first capacitor 602 and the ground input 43. Further, the S/H circuit 609 is connected to the first capacitor node of the second capacitor 602. The logic 610 is further configured, after the second time period and before the off-time ends, to close the fifth and sixth switch 607, 608 (while the remainder of the switches are open) and to activate the S/H circuit to sample the voltage at the first capacitor node of the second capacitor 602. A voltage at the first capacitor node of the second capacitor 602 equals the magnitude V1 of the auxiliary voltage $V_{AUX}$ sampled by the first capacitor 601 during the first time period plus the magnitude V2 of the auxiliary voltage $V_{AUX}$ sampled by the second capacitor 602 during the second time period.

Figure 15:
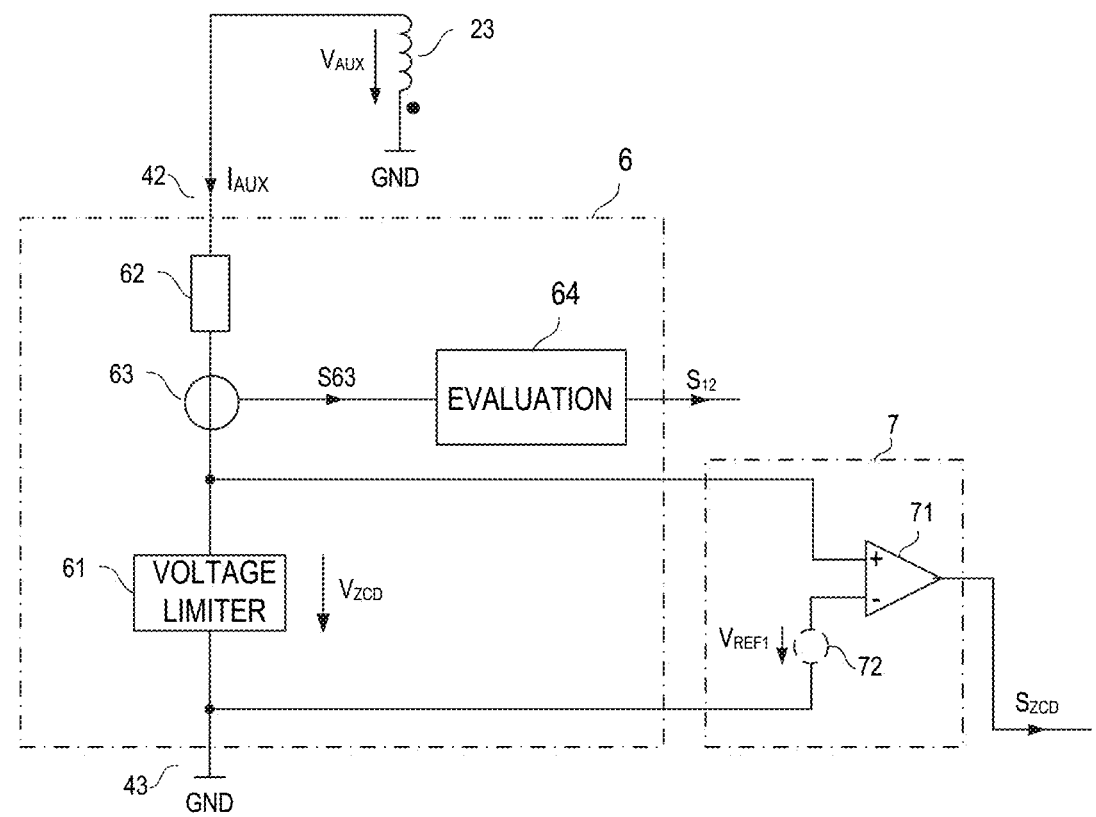
FIG. 15 shows another example of the voltage measurement circuit.

Another example of a voltage measurement circuit 6 is illustrated in FIG. 15. In this example, the voltage measurement circuit 6 includes a voltage limiter 61 and a resistor 62 connected in series between the auxiliary voltage input 42 and the ground input 43 of the control circuit 4. The control circuit 4 may be implemented as an integrated circuit (IC). In this case, the resistor 62 may be an external resistor connected between the auxiliary winding 23 and a respective input of the IC.

Referring to FIG. 15, the voltage measurement circuit 6 further includes a current sensor 63 configured to measure a current $I_{AUX}$ from the auxiliary winding 23 via the resistor 62 and the voltage limiter 61 to the ground input 43. This current $I_{AUX}$ is also referred to as auxiliary current in the following. An evaluation circuit 64 receives a current measurement signal S63 that represents the auxiliary current $I_{AUX}$ from the current sensor and outputs the voltage measurement signal $S_{12}$.

When the voltage measurement circuit 6 is implemented as illustrated in FIG. 15, the crossing detection circuit 7 may monitor a voltage $V_{ZCD}$ across the voltage limiter 61 instead of the auxiliary voltage. The voltage limiter is configured to clamp the voltage $V_{ZCD}$ to a first (positive) level when the auxiliary voltage $V_{AUX}$ is positive and a second (negative) level when the auxiliary voltage $V_{AUX}$ is negative. According to one example, these voltage levels are higher than the reference voltage $V_{REF1}$. The voltage $V_{ZCD}$ across the voltage limiter 61, which may be referred to as clamped auxiliary voltage or crossing detection voltage, is not proportional to the auxiliary voltage $V_{AUX}$. This voltage $V_{ZCD}$, however, is below the reference voltage $V_{REF1}$ each time the auxiliary voltage $V_{AUX}$ is below the reference voltage $V_{REF1}$. Thus, the voltage $V_{ZCD}$ across the voltage limiter can be used to detect time instances when the auxiliary voltage $V_{AUX}$ crosses the reference voltage $V_{REF1}$. In each case, the crossing detection signal $S_{ZCD}$ output by the crossing detection circuit 7 represents those time instances at which the auxiliary voltage $V_{AUX}$ crosses the first reference voltage $V_{REF1}$, such as zero.

Figure 16A:
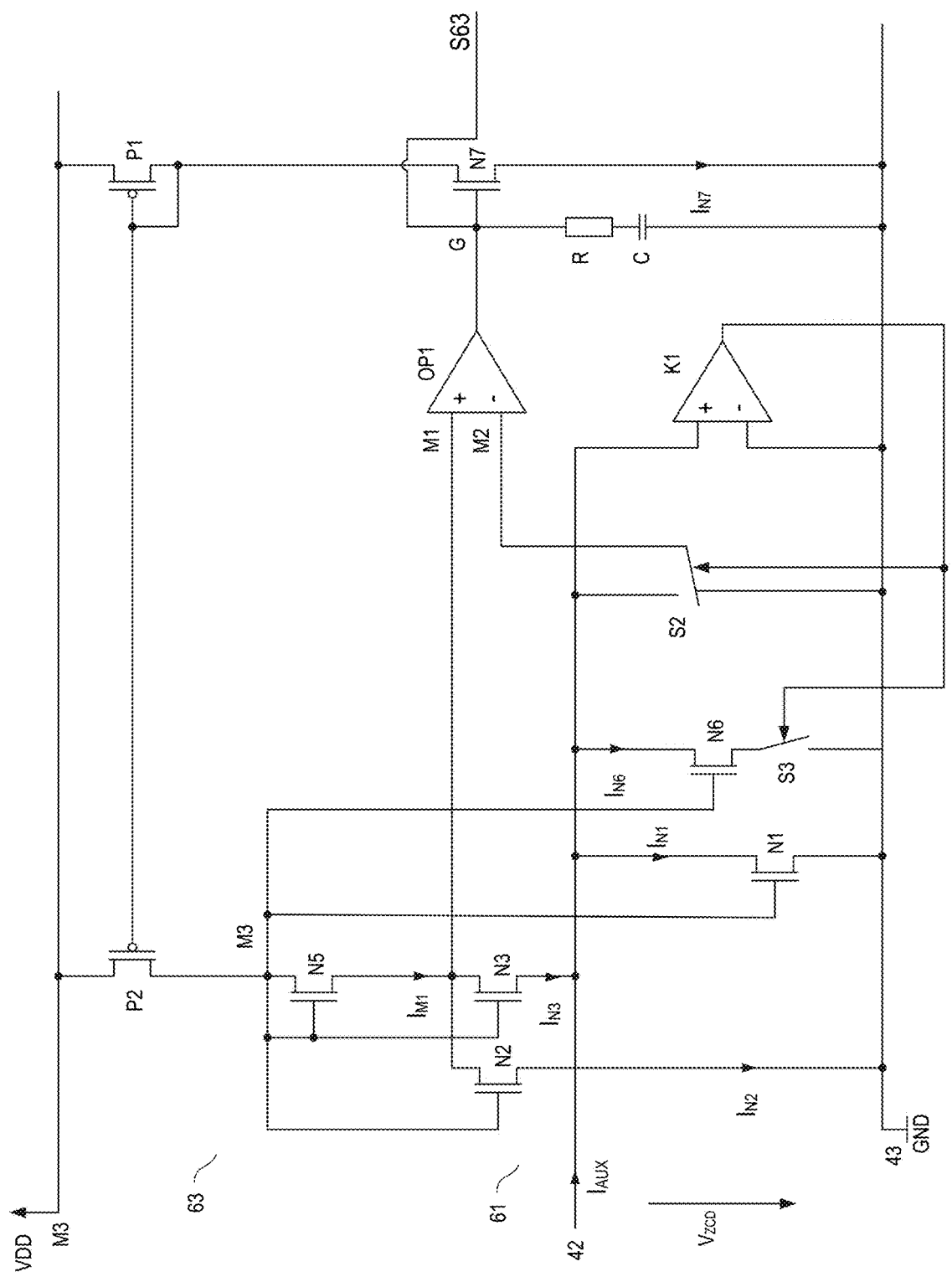
FIGS. 16A and 16B illustrate one example of the voltage measurement circuit shown in FIG. 15 in greater detail.
Figure 16B:
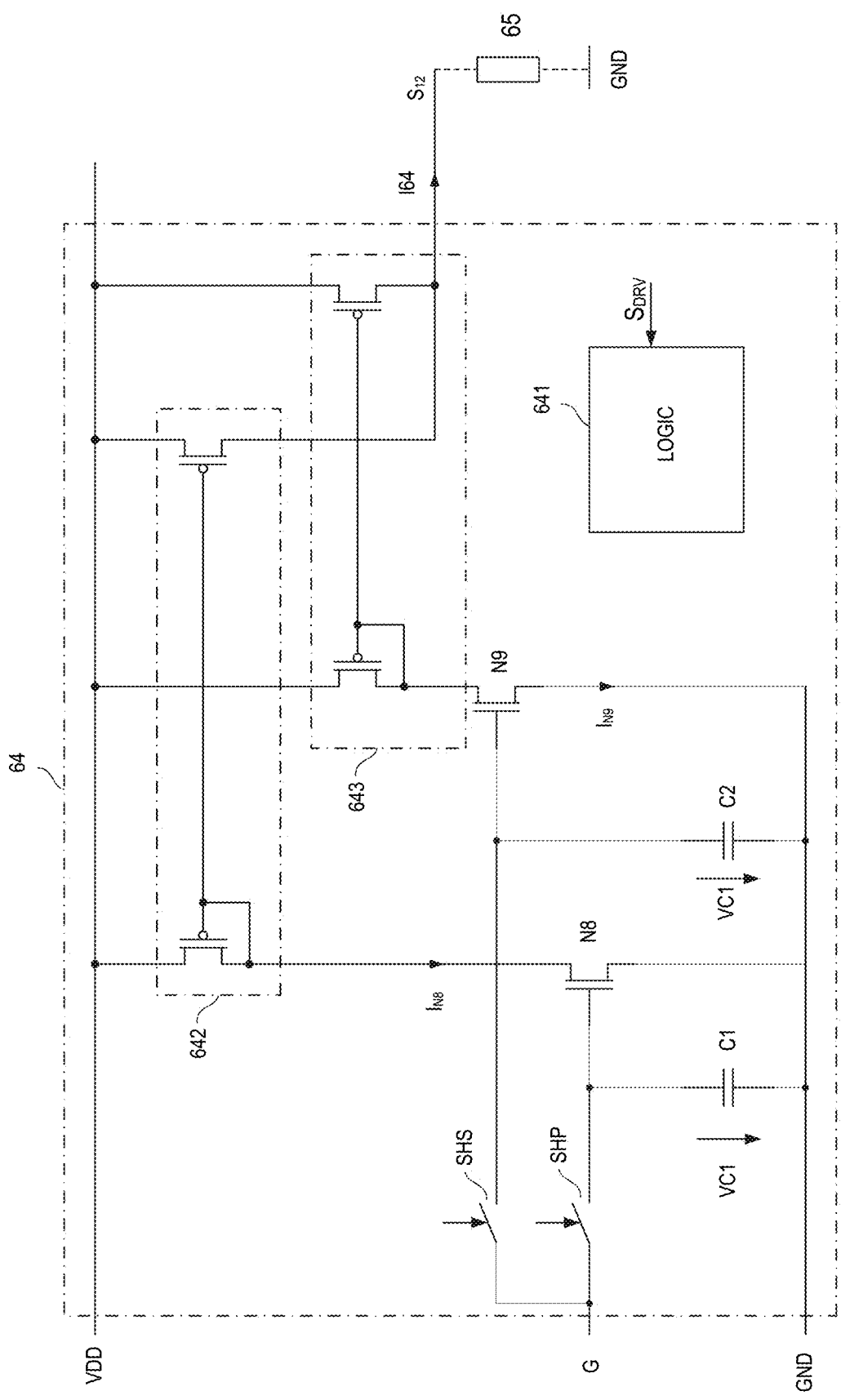

When the auxiliary voltage $V_{AUX}$ is higher than the voltage limit defined by the voltage limiter 61, an auxiliary current $I_{AUX}$ flows through the voltage limiter 61. In the example shown in FIG. 15, a magnitude of the auxiliary current $I_{AUX}$ is essentially given by $$I_{AUX} = \frac{V62}{R62} = \frac{V_{AUX} - V_{ZCD}}{R62}, \quad (1)$$

where R62 is a resistance of the resistor 62 and $V_{ZCD}$ is the voltage across the voltage limiter 61. According to one example, the voltage limiter 61 is implemented such that the voltage $V_{ZCD}$ across the voltage limiter 61 is significantly lower than the auxiliary voltage $V_{AUX}$ so that voltage across the voltage limiter is negligible compared to the auxiliary voltage. In this case, the auxiliary current $I_{AUX}$ measured by the current sensor 63 is essentially proportional to the auxiliary voltage $V_{AUX}$, so that by measuring the auxiliary current $I_{AUX}$ the auxiliary voltage $V_{AUX}$ and, therefore, the voltage measurement signal S12 can be obtained. FIG. 16A illustrates one example of the voltage limiter 61 and the current sensor 63 and FIG. 16B illustrates one example of the evaluation circuit 64.

Referring to FIG. 16A, the voltage limiter 61 includes a first transistor N1 connected between the auxiliary voltage input 42 and the ground input 43 of the drive circuit 4. The first transistor N1 clamps the crossing detection voltage $V_{ZCD}$. Driving the first transistor N1 in an on-state so that it clamps the crossing detection voltage $V_{ZCD}$ is explained in detail herein further below.

The voltage limiter 61 further includes a second transistor N2 connected between a first circuit node M1 and the ground node 12, and a third transistor N3 connected between the first circuit node M1 and the auxiliary voltage input 42. Further, a current regulator is configured to control a current $I_{M1}$ into the first circuit node M1 in two different ways dependent on a polarity of the auxiliary voltage $V_{AUX}$. The current $I_{M1}$ into the first circuit node is provided from a supply node M3 where a supply voltage VDD is available. The supply voltage may be provided by power supply circuit (not shown in the drawings) in the control circuit 4. This power supply may generate the supply voltage VDD based on the auxiliary voltage $V_{AUX}$ or based on any other input voltage received by the control circuit 4.

When the auxiliary voltage $V_{AUX}$ is positive, the regulator controls the current $I_{M1}$ into the first circuit node M1 such that the first transistor N1 and the second transistor N2 are operated in the same operating point and a current $I_{N3}$ through the third transistor N3 is zero. In this case, a current level of a current $I_{N2}$ through the second transistor N2 is proportional to a current $I_{N1}$ through the first transistor N1, wherein the current $I_{N1}$ through the first transistor N1 equals the auxiliary current $I_{AUX}$. According to one example, the first transistor N1 and the second transistor N2 have the same length and the same width. In this case, the current $I_{N2}$ through the second transistor N2 and the auxiliary current $I_{AUX}$ have the same current level.

According to one example, the regulator includes an operational amplifier OP1 that has a first input connected to the first circuit node M1 and second input connected to a second circuit node M2. A switch S2 that is controlled by a comparator K1 connects the second circuit node M2 to the second input 42 when the auxiliary voltage $V_{AUX}$ has the first polarity. In this case, the operational amplifier OP1 controls the current $I_{M1}$ into the first circuit node M1 such that the potential at the first circuit node M1 equals the potential at the second input 42, so that a voltage across the third transistor N3 is zero. Thus, as mentioned above, the current $I_{N3}$ through the third transistor N3 is zero.

The regulator further includes a variable resistor N7 driven by the operational amplifier OP1 and connected between the supply node M3 and the ground node 12, and a current mirror P1, P2. According to one example, the variable resistor N7 includes a transistor driven by the operational amplifier. Optionally, a filter is connected between an output of the operational amplifier OP1 and the transistor of the variable resistor N7. This filter may include a series circuit with a resistor R and a capacitor C.

The current mirror P1, P2 is configured to mirror a current $I_{N7}$ through the variable resistor N7 such that the current $I_{M1}$ into the first circuit node M1 is proportional to the current $I_{N7}$ through the variable resistor N7, wherein a proportionality factor between the current through the variable resistor N7 and the current $I_{M1}$ into the first circuit node M1 is given by a current mirror ratio of the current mirror. According to one example, the current mirror ratio is 1:1, so that the current $I_{M1}$ into the first circuit M1 equals the current $I_{N7}$ through the variable resistor N7. The regulator, via the variable resistor N7 and the current mirror P1, P2, adjusts the current $I_{M1}$ into the first circuit node M1 such that the current $I_{N3}$ through the third transistor N3 is zero, so that—in a steady state of the regulator—the current $I_{M1}$ into the first circuit node M1 equals the current $I_{N2}$ through the second transistor N2, wherein the latter is proportional to the auxiliary current $I_{AUX}$. Thus, given the proportionality between the current $I_{M1}$ into the first circuit node M1 and the current $I_{N7}$ through the variable resistor N7, the current through the variable resistor N7 is proportional to the auxiliary current $I_{AUX}$.

Referring to FIG. 16A, the voltage limiter 61 further includes a further transistor N5 connected between an output transistor P2 of the current mirror P1, P2 and the first circuit node M1. This further transistor N5 is connected as a diode. That is, a drain node of the further transistor N5 is connected to its gate node. Further, gate nodes of the first, second and third transistors N1, N2, N3 are connected to the drain/gate node of the further transistor, so that these transistors N1, N2, N3 have the same electrical potential at their respective gate node. The first transistor N1 and the second transistor N2 are activated, so that they may conduct a current, as soon as the potential at their respective gate node reaches a level at which gate-source voltage of these transistors N1, N2 becomes higher than the respective threshold voltages. According to one example, the first, second and third transistor N1-N3 have the same threshold voltage. The threshold voltage of the fifth transistor N5 may be lower than the threshold voltages of the first, second and third transistor N1, N2, N3.

When the auxiliary voltage $V_{AUX}$ is negative the switch S2 controlled by the comparator K1 connects the second circuit node M2 to the ground input 43 and the third transistor N3 is regulated such that the potential at the first circuit node M1 equals ground potential GND. The auxiliary current $I_{AUX}$ is negative, that is, the auxiliary current $I_{AUX}$ flows in a direction opposite the direction illustrated in FIG. 16A. Further, in this operating state, the auxiliary current $I_{AUX}$ is given by the current $I_{N3}$ through the third transistor N3 minus the current $I_{N1}$ through the first transistor N1. The current $I_{N2}$ through the second transistor N2 is zero, and the current $I_{M1}$ into the first circuit node M1 equals the current $I_{N3}$ through the third transistor N3. The current $I_{N7}$ through the variable resistor N7 is again proportional to the current $I_{M1}$ into the first circuit node. As the first transistor N1 and third transistor N3 are operated in the same operating point, the current $I_{N3}$ through the third transistor N3 is proportional to the auxiliary current $I_{AUX}$ wherein a proportionality factor is dependent on a size of the first transistor N1 and a size of the third transistor N3.

Referring to the above, when the auxiliary voltage $V_{AUX}$ is positive, the current $I_{N2}$ through the second transistor N2 is proportional to the auxiliary current $I_{AUX}$, wherein a proportionality factor is dependent on a size of the first transistor $N_1$ and a size of the second transistor N3. Further, when the auxiliary voltage $V_{AUX}$ is negative, the current $I_{N3}$ through the third transistor N3 is proportional to the auxiliary current $I_{AUX}$, wherein a proportionality factor is dependent on a size of the first transistor N1 and a size of the third transistor N3. The sizes of the first, second and third transistors can be adapted to one another such that a proportionality factor between a magnitude of the auxiliary current $I_{AUX}$ and the current $I_{M1}$ into the first circuit node M1 is the same when the auxiliary voltage $V_{AUX}$ (and the auxiliary current $I_{AUX}$) is positive and when the auxiliary voltage $V_{AUX}$ (and the auxiliary current $I_{AUX}$) is negative. In this case, these transistors N1, N2, N3 are implemented with different sizes.

According to another example, the first, second and third transistors N1, N2, N3 have the same size and the current sensor additionally includes a further transistor N6. This further transistor N6 is connected in parallel with the first transistor N1 only when the auxiliary voltage $V_{AUX}$ is positive. This is achieved by a further switch S3 connected in series with the further transistor N6 and controlled by the comparator K1. The further transistor N6 is controlled in the same way as the first transistor N1 by the potential at the third circuit node M3. In this circuit, when the auxiliary voltage $V_{AUX}$ is positive, the current $I_{N1}$ through the first transistor N1 and a current $I_{N6}$ through the further transistor N6 each equals 50% of the auxiliary current $I_{AUX}$. Further, the current $I_{N2}$ through the second transistor N2 and the current $I_{M1}$ into the first circuit node M1 equal 50% of the auxiliary current $I_{AUX}$. When the auxiliary voltage $V_{AUX}$ is negative, the current $I_{N3}$ through the third transistor and, therefore, the current into the first circuit node M1 also equals 50% of the auxiliary current, so that the proportionality factor between the magnitude of the auxiliary current $I_{AUX}$ and the current $I_{M1}$ into the first circuit node M1 and, therefore, the proportionality factor between the magnitude of the auxiliary current $I_{AUX}$ and the current $I_{N7}$ through the variable resistor N7 is the same when the auxiliary voltage $V_{AUX}$ is positive and when the auxiliary voltage $V_{AUX}$ is negative.

The clamping voltage, which is the voltage level at which the crossing detection voltage $V_{ZCD}$ is clamped by the voltage limiter 61, is predefined, but not fixed. This clamping voltage is defined by the characteristic curve of the first transistor $N_1$ and is dependent on a current level of the auxiliary current $I_{AUX}$. Thus, at each voltage level of the auxiliary voltage $V_{AUX}$ the clamping voltage is predefined by the first transistor N1, but not fixed. Basically, the higher the auxiliary current $I_{AUX}$ the higher the clamping voltage. However, there is a square relationship between the clamping voltage and the auxiliary current $I_{AUX}$ so that variations of the clamping voltage dependent on the auxiliary current $I_{AUX}$ are essentially negligible.

According to one example, the first transistor N1 is implemented such that a voltage drop across the first transistor N1 is less than 5% or even less than 2% of the auxiliary voltage $V_{AUX}$ during the demagnetization phase. In this case, despite variations, a magnitude of the crossing detection voltage $V_{ZCD}$ is almost negligible compared to the magnitude of the auxiliary voltage $V_{AUX}$, so that in each case the auxiliary current $I_{AUX}$ is essentially proportional to the auxiliary voltage $V_{AUX}$.

In the current sensor 63 illustrated in FIG. 16A, the current $I_{N7}$ through the transistor forming the variable resistor N7 and the electrical potential at a gate node G of this transistor N7 represent the auxiliary current $I_{AUX}$ and, therefore, the auxiliary voltage $V_{AUX}$. More specifically, the current $I_{N7}$ is proportional to a magnitude of the auxiliary current $I_{AUX}$. That is, current $I_{N7}$, independent of a current flow direction of the auxiliary current $I_{AUX}$, always flows in the same direction and has a signal level that is proportional to the magnitude of the auxiliary current $I_{AUX}$. The potential at the gate node forms the current measurement signal S63 in this example. An evaluation circuit 64 configured to generate the measurement signal $S_{12}$ based on this current measurement signal S63 is illustrated in FIG. 16B. The gate node G of the transistor N7 is also referred to as output of the current sensor in the following, and the transistor N7 is also referred to as output transistor of the current sensor.

The evaluation circuit shown in FIG. 16B includes a first capacitor C1 coupled to the output G of the current sensor 63 through a first switch SHP and a second capacitor C2 coupled to the output G of the current sensor 63 through a second switch SHS. The first switch SHP and the second switch SHS are controlled by a logic 641 dependent on the drive signal $S_{DRV}$. The logic 641 is configured to control the first switch SHP such that the first capacitor C1 is connected to the output G of the current sensor 63 for a first time period during the on-time so that at the end of this first time period a voltage VC1 across the first capacitor C1 equals the voltage at the output G of the current sensor 63. The logic 641 is further configured to control the second switch SHS such that the second capacitor C2 is connected to the output G of the current sensor 63 for a second time period during the off-time so that at the end of this second time period a voltage VC2 across the second capacitor C2 equals the voltage at the output G of the current sensor 63.

Referring to FIG. 16B, the evaluation circuit 64 further includes a first transistor N8 driven by the voltage VC1 across the first capacitor C1 and a second transistor N9 driven by the voltage VC2 across the second capacitor C2. According to one example, the first transistor N8 and the second transistor N9 have the same size as the output transistor N7 of the current sensor 63. In this case, a first current $I_{N8}$ through the first transistor N8 equals the current $I_{N7}$ through the output transistor N7 of the current sensor 63 during the first time period, wherein this current is proportional to the auxiliary voltage $V_{AUX}$ during the on-time and, therefore, proportional to the first magnitude V1 explained above. Further, a second current $I_{N9}$ through the second transistor N9 equals the current $I_{N7}$ through the output transistor N7 of the current sensor 63 during the second time period, wherein this current is proportional to the auxiliary voltage $V_{AUX}$ during the off-time and, therefore, proportional to the second voltage V2 explained above.

Referring to FIG. 16B, the evaluation circuit 64 further includes a first current mirror 642 having an input connected to the first transistor N8 and a second current mirror 643 having an input connected to the second transistor N9. Outputs of the current mirrors 642, 643 are connected. Further, the current mirrors 642, 643 may have the same current mirror ratio so that an output current I64 of the current mirrors 642, 643 is proportional to a sum of the first and second currents $I_{N8}$, $I_{N9}$ and, therefore, proportional to the sum of the first magnitude V1 and the second magnitude V2. This output current I64 may form the voltage measurement signal S12. Alternatively, as illustrated in dashed lines in FIG. 16B, a resistor 65 is connected in series with the output of the current mirrors 642, 643. In this case, the voltage measurement signal S12 is a voltage across the resistor 65.

FIG. 3 illustrates operating the power converter in the quasi-resonant mode. In this operating mode, a delay time $T_{DEL}$ between the demagnetization time instance $t_{DEMAG}$ and the end of the off-time is about one half of one oscillation period $T_{OSC}$. Further, in this method, the on-time is adjusted dependent on the first measurement signal $S_{12}$. In this method, the shorter the delay time $T_{DEL}$ relative to overall duration T of the drive cycle, the more accurate the waveform of the input current $I_{IN}$ can be controlled.

Another type of operating mode, which is referred to as second operating mode in the following, is explained in the following. In this operating mode, the delay time $T_{DEL}$ is considered when adjusting the duration $T_{ON}$ of the on-time. In this way, the waveform of the input current $I_{IN}$ can be regulated in an accurate way, even when the delay time $T_{DEL}$ is not negligible as compared to the overall time duration T of the drive cycle. The second operating mode may include operating the power converter in the quasi-resonant (QR) mode or in a valley skipping QR mode. In the valley skipping QR mode, one or more valleys of the switch voltage V22 are skipped before the switch 22 again switches on. In this operating mode, a delay time $T_{DEL}$ between the demagnetization time instance $t_{DEMAG}$ and the time instance when the electronic switch 22 again switches on is longer than one half of a period of the parasitic oscillations. Signal diagrams that are based on the signal diagrams shown in FIG. 3 and that illustrate operating the power converter in the valley skipping quasi-resonant mode are illustrated in FIG. 17.

Figure 17:
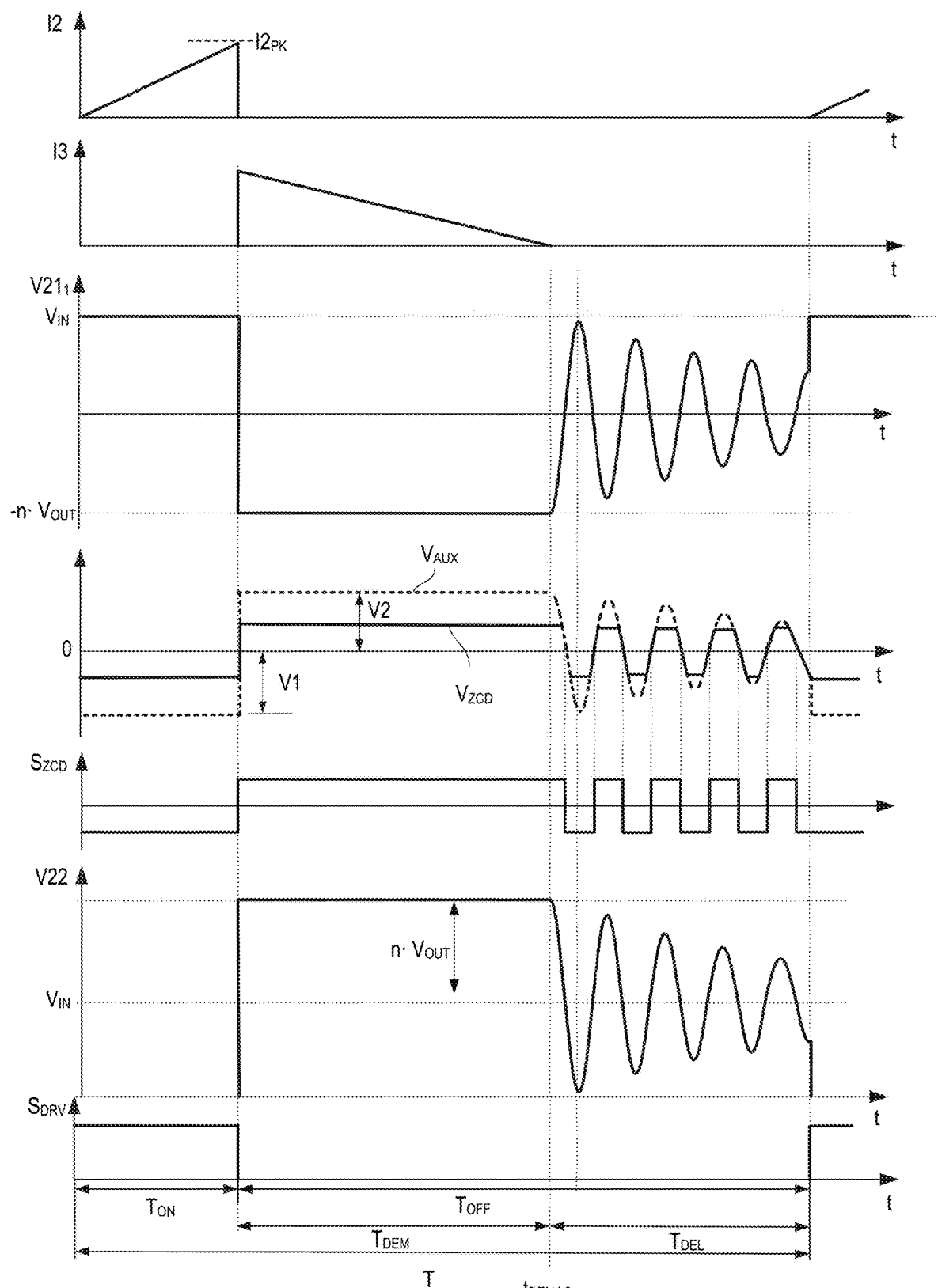
FIG. 17 shows signal diagrams that illustrate operating the power converter in a second operating mode.

As can be seen from FIG. 17, in the valley skipping quasi-resonant mode, the delay time $T_{DEL}$ may include a significant portion of the overall time duration T of the drive cycle. In the QR mode and the valley skipping QR mode, the delay time $T_{DEL}$ between the demagnetization time instance $t_{DEMAG}$ and the start of a new drive cycle is given by $T_{DEL} = (i-0,5) \cdot T_{OSC}$, wherein $T_{OSC}$ is the duration of one period of the parasitic oscillations and i is the order number of the valley in which the electronic switch 22 switches on, wherein i is an integer and wherein i≥1. Equivalently, i−1 is the number of valleys that are skipped. The power converter operates in the QR mode when the electronic switch 22 switches on in the first (i=1) valley and operates in the valley skipping QR mode when i>1, that is, when one or more valleys are skipped.

Figure 18:
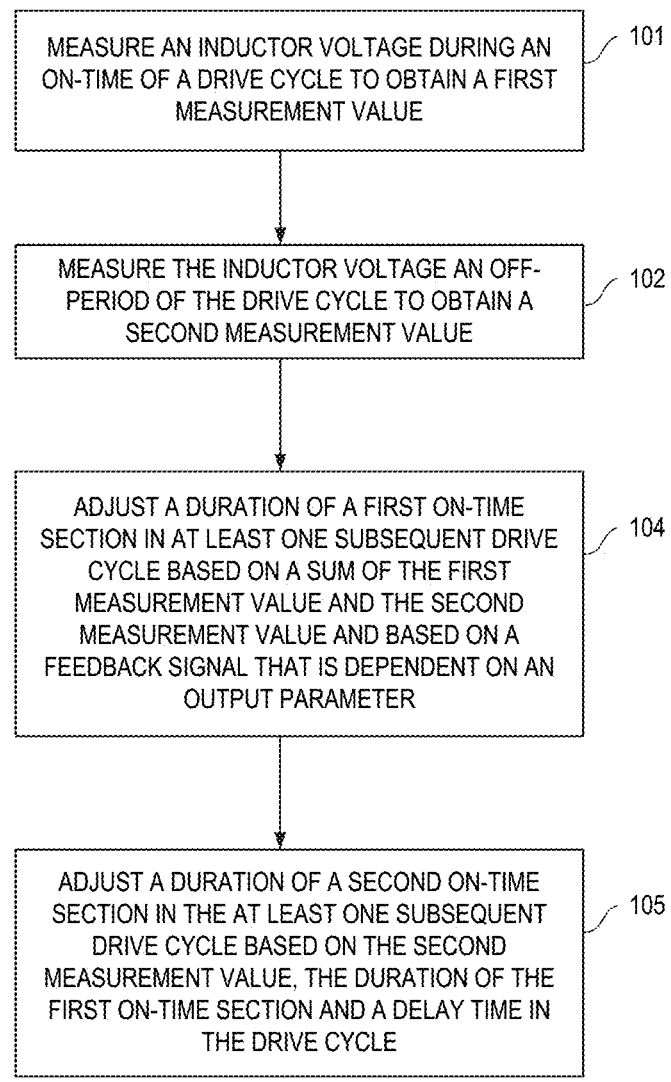
FIG. 18 is a flowchart that illustrates operating the power converter in the second operating mode.

FIG. 18 shows a flowchart of one example of a method for operating the power converter in the quasi-resonant mode such that the output parameter has a predefined value and such the waveform of the average input current $I_{IN\_AVG}$ essentially equals the waveform of the input voltage $V_{IN}$. This method is based on the method illustrated in FIG. 5 and is different from the method illustrated in FIG. 5 in that the on-time in each drive cycle includes two on-time sections, a first on-time section and a second on-time section. The first on-time section, similar to the on-time in the first operating mode, is dependent on the sum of the first measurement value and the second measurement value and the feedback signal (104), wherein the first and second measurement values are obtained in one or more previous drive cycles. The second on-time section is dependent on the second measurement value obtained in the previous drive cycle, the duration of the first on-time section in the instantaneous drive cycle, and the delay time between the demagnetization of the transformer and the begin of a new drive cycle in the previous drive cycle (105).

Figure 19:
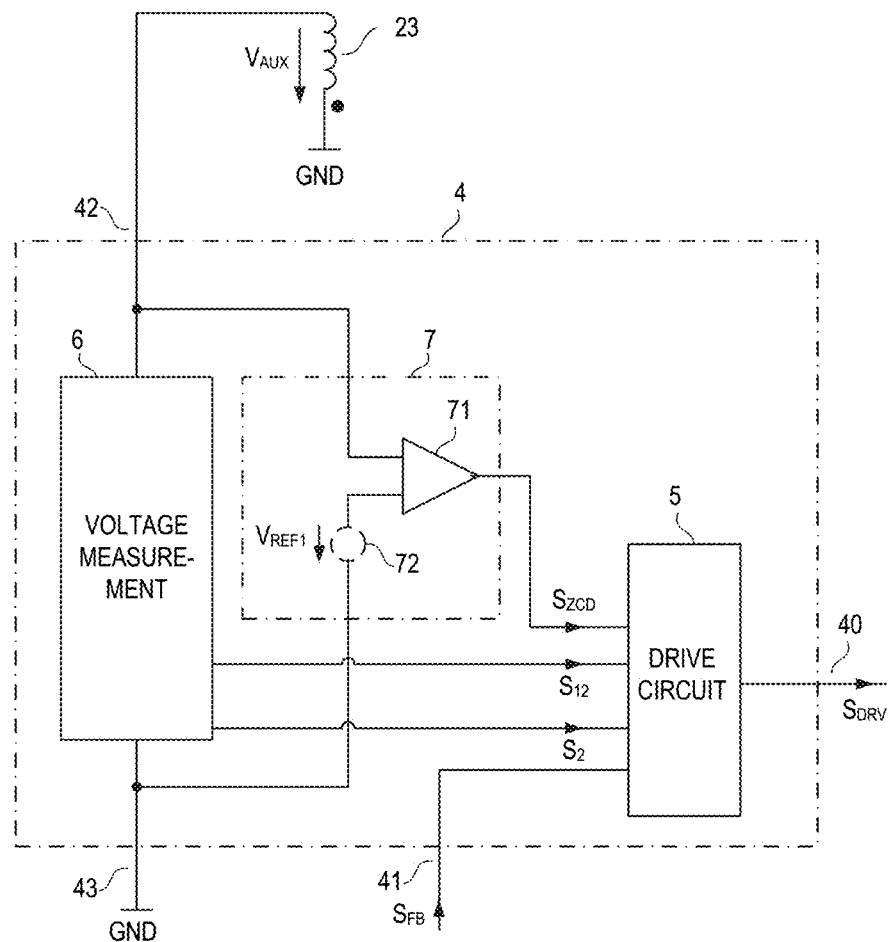
FIG. 19 illustrates a modification of the control circuit shown in FIG. 6.

FIG. 19 illustrates one example of a control circuit 4 configured to operate the power converter in accordance with the method illustrated in FIG. 18. This control circuit 4 is based on the control circuit shown in FIG. 6 and is different from the control circuit shown in FIG. 6 in that the drive circuit 5 additionally receives a further voltage measurement signal $S_2$, wherein this further voltage measurement signal $S_2$ represents the second measurement value V2, that is, the magnitude of the auxiliary voltage $V_{AUX}$ during the off-time. The voltage measurement signal $S_{12}$ is also referred to as first voltage measurement signal in the following, and the further voltage measurement signal $S_2$ is also referred to as second voltage measurement signal in the following.

Figure 20:
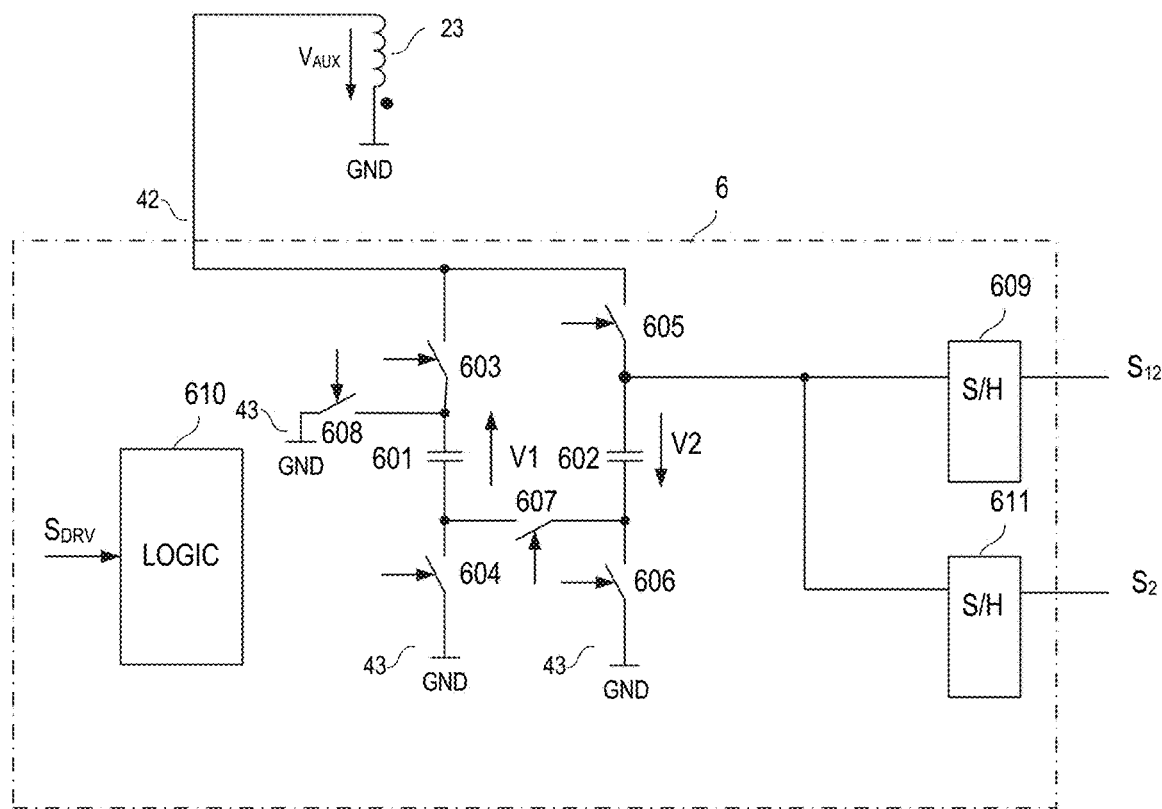
FIG. 20 illustrates a modification of the voltage measurement circuit shown in FIG. 14.

One example of the voltage measurement circuit 6 configured to output the first voltage measurement signal $S_{12}$ and the second voltage measurement signal $S_2$ is illustrated in FIG. 20. This voltage measurement circuit 6 is based on the voltage measurement circuit illustrated in FIG. 14 and additionally includes a further S/H circuit 611. This further S/H circuit 611 is controlled by the logic 610 and configured to sample the voltage V2 across the first capacitor 601 at the end of the second time period.

Figure 21:
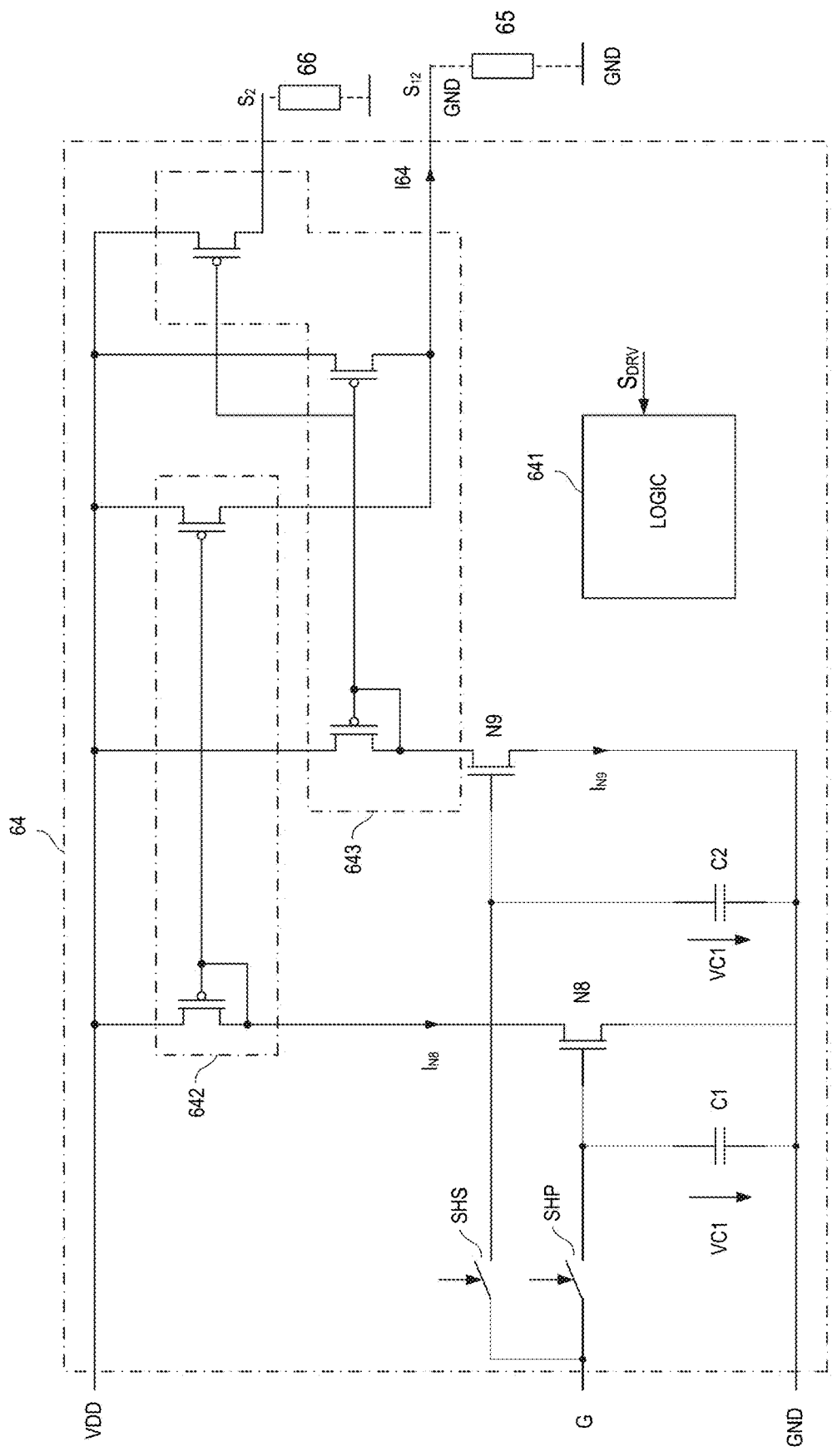
FIG. 21 illustrates a modification of the voltage measurement circuit shown in FIGS. 16A and 16B.

According to another example, the voltage measurement circuit 6 is based on the voltage measurement circuit illustrated in FIGS. 16A and 16B, wherein just one modification in the evaluation circuit 64 is required in order to output both the first voltage measurement signal $S_{12}$ and the second voltage measurement signal S2. One example of a corresponding evaluation circuit 64 is illustrated in FIG. 21. In this evaluation circuit 64, the second current mirror 643 includes two outputs, a first output connected to the output of the first current mirror 642, and a second output providing an output current proportional to the second current $I_{N9}$ explained above. This output current is proportional to the second magnitude V2 of the auxiliary voltage $V_{AUX}$ and forms the second voltage measurement signal $S_2$. Alternatively, a resistor 66 is connected in series to the second current mirror output, so that the second voltage measurement signal $S_2$ is a voltage.

Figure 22:
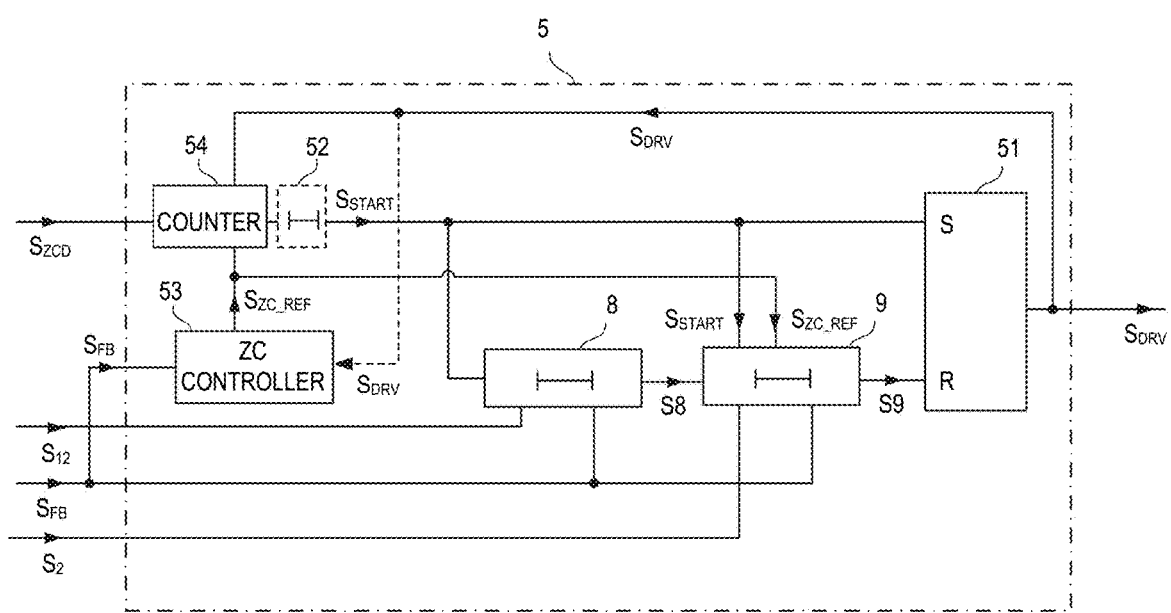
FIG. 22 illustrates one example of a drive circuit in the control circuit shown in FIG. 18.

FIG. 22 illustrates one example of the drive circuit 5 shown in FIG. 19. This drive circuit 5 is based on the drive circuit shown in FIG. 7 and additionally includes a zero crossing controller 53 that receives the feedback signal $S_{FB}$ and outputs a zero crossing reference signal $S_{ZC\_REF}$, a counter 54 that receives the zero crossing reference signal $S_{ZC\_REF}$ and the zero crossing detection signal $S_{ZCD}$, and a further on-time control circuit 9 connected between the on-time control circuit 8 and the latch 51. The on-time control circuit 8 is also referred to as first on-time control circuit and the further on-time control circuit 9 is also referred to as second on-time control circuit in the following. The second on-time control circuit 9 receives the end signal S8 from the first on-time control circuit 8 and outputs an end signal S9 to the latch 51. The end signal S8 from the first on-time control circuit 8, which is also referred to as first end signal in the following, indicates an end of the first on-time section, and the end signal S9 from the second on-time control circuit 9, which is also referred to as second end signal in the following, indicates an end of the second on-time section explained above.

The second on-time control circuit 9 further receives the feedback signal $S_{FB}$ and the further voltage measurement signal $S_2$, the start signal $S_{START}$ and the zero crossing reference signal $S_{ZC\_REF}$. The zero crossing reference signal $S_{ZC\_REF}$ represents the delay time $T_{DEL}$ between the demagnetization time instance $t_{DEMAG}$ and the start of a new drive cycle, that is, the zero crossing reference signal $S_{ZC\_REF}$ represents the number of zero crossings of the auxiliary voltage $V_{AUX}$ that are allowed to occur before a new drive cycle starts. This zero crossing reference signal $S_{ZC\_REF}$ is dependent on the feedback signal $S_{FB}$.

Figure 23:
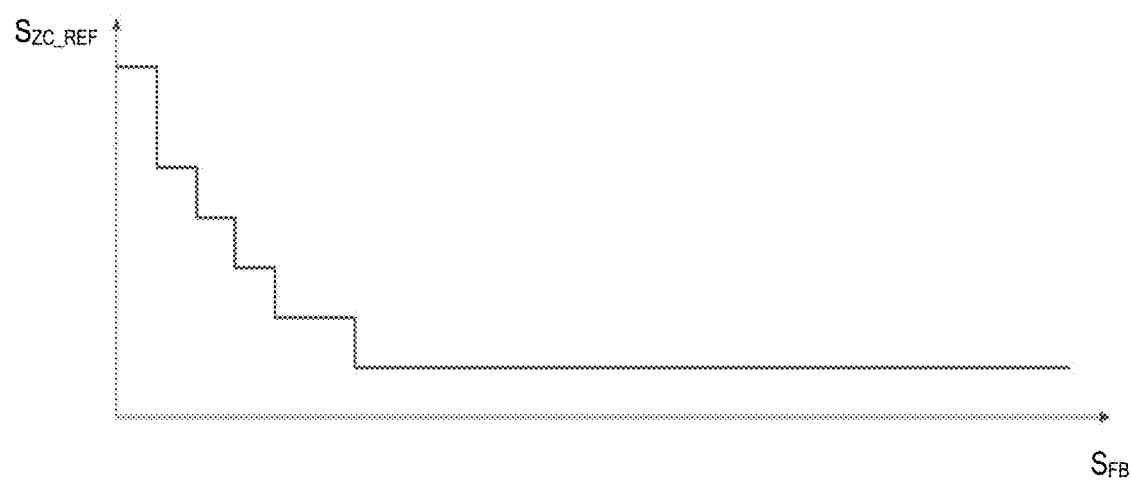
FIG. 23 illustrates the functionality of a zero crossing controller in the drive circuit shown in FIG. 22.

According to one example, the feedback signal $S_{FB}$ is generated such that the feedback signal $S_{FB}$ decreases as the power consumption of the load decreases. Further, the zero crossing reference signal $S_{ZC\_REF}$ may be is generated such that the number of zero crossings that are allowed to occur before a new drive cycle start decrease as the feedback signal $S_{FB}$ increases. One example of such dependency of the zero crossing reference signal $S_{ZC\_REF}$ on the feedback signal $S_{FB}$ is illustrated in FIG. 23.

Referring to FIG. 22, the counter 54 receives the zero crossing detection signal $S_{ZCD}$ and the zero crossing reference signal $S_{ZC\_REF}$ and is configured to generate the start signal $S_{START}$ when, during the off-time, the number of zero crossings defined by the zero crossing reference signal $S_{ZC\_REF}$ has occurred. The delay element 52 may delay generating the start signal $S_{START}$ for one quarter of one period $T_{OSC}$ of the parasitic oscillations, as already explained with reference to FIG. 7.

The first on-time control circuit 8 may be configured in accordance with any of the examples explained herein before. In particular, the first on-time control circuit 8 may be configured in accordance with the example illustrated in FIG. 10. One example of the second on-time control circuit 9 is illustrated in FIG. 24.

Figure 24:
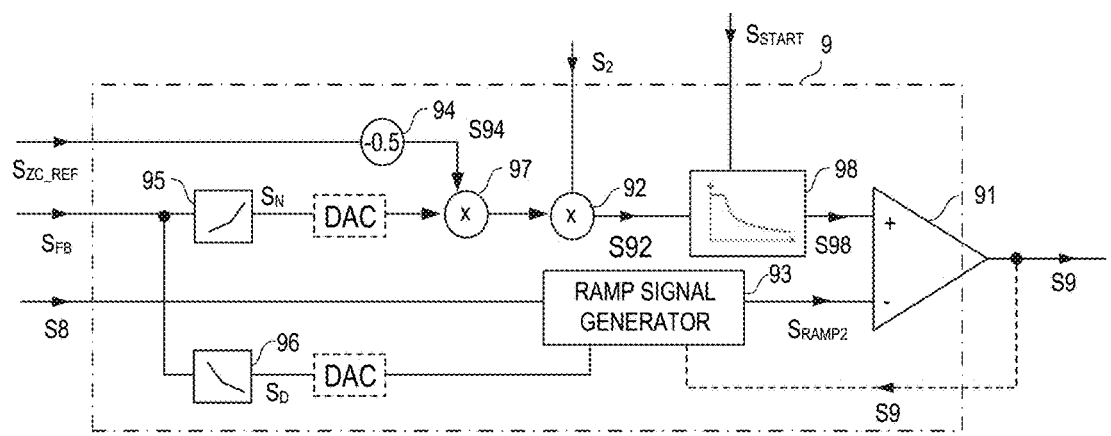
FIG. 24 illustrates one example of a further on-time control circuit in the drive circuit shown in FIG. 22.

The second on-time control circuit 9 shown in FIG. 24 is similar to the first on-time control circuit 8 shown in FIG. 10 and includes a comparator 91 that receives a second ramp signal $S_{RAMP2}$ from a ramp signal generator 93 and a reference signal S98, wherein this reference signal S98 is proportional to the delay time $T_{DEL}$, the second measurement signal $S_2$, and inversely proportional to the time duration since the beginning of the instantaneous on-time. This reference signal S98 is provided by a function generator 98 that receives the start signal $S_{START}$, which includes the information on the beginning of the instantaneous on-time. Further, the function generator 98 receives a signal that is proportional to the second measurement signal $S_2$, and the delay time $T_{DEL}$. The information on the delay time $T_{DEL}$ is included in a signal S94 that is obtained from the zero crossing reference signal $S_{ZC\_REF}$ by subtracting 0.5 by a subtractor 94. This signal S94 is multiplied with the second measurement signal $S_2$ and either the feedback signal $S_{FB}$ or a signal dependent on the feedback signal.

As explained above, instead of the feedback signal $S_{FB}$ an exponential feedback signal $e^{S_{FB}}$ or, as explained with reference to FIGS. 11 and 13 instead of a function generator calculating $e^{S_{FB}}$ two function generators, each implementing a piecewise linear function may be used. In the example illustrated in FIG. 24, two such function generators are used. A first function generator 95 and a second function generator 96. These function generators 95, 96 can be the same function generators as the function generators 85, 86 in the first on-time control circuit 8. That is, one first function generator may be used as the first function generator 85 in the first on-time control circuit 8 and the first function generator 95 in the second on-time control circuit 9. Equivalently, one and the same function generator may be used as the second function generator 86 in the first on-time control circuit 8 and the second function generator 96 in the second on-time control circuit 9. These function generators can be digital function generators wherein the ramp signal generators 83, 93 may be implemented using analog circuit elements. Further, the function generator 98 illustrated in FIG. 24 may be implemented using analog circuit elements. In this case, digital-to-analog converters (DACs) may be connected between the function generators 96 and 95 and the ramp signal generator 93 and the multiplier 97. When the function generators 85, 95 in the first and second on-time control circuits 8, 9 are implemented using only one function generator only one DAC is required. Equivalently, when the function generators 86, 96 in the first and second on-time control circuits 8, 9 are implemented using only one function generator only one DAC is required.

Referring to FIG. 24, the multiplier 97 multiplies the first function generator output signal $S_N$ with the delay time signal S94. A further multiplier 92 multiplies the result of the first multiplier 97 with the further measurement value $S_2$, wherein an output signal S92 of the second multiplier 92 is received by the function generator 98. Although FIG. 24 shows two multipliers 92, 97, this is only an example. According to another example, the multiplier 92 is a multiplying digital-to-analog converter and the multiplier 97 is a digital multiplier.

Figure 25:
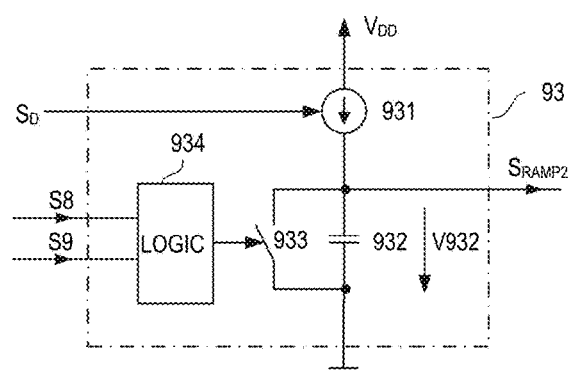
FIG. 25 illustrates one example of a ramp signal generator in the further on-time control circuit shown in FIG. 24.

One example of the ramp signal generator 93 shown in FIG. 24 is illustrated in FIG. 25. This function generator 93 is implemented in the same way as the ramp signal generator 83 illustrated in FIG. 12 and includes a series circuit with a current source 931 and a capacitor 932. The second ramp signal $S_{RAMP2}$ is the voltage V932 across the capacitor 932. A switch 933 is connected in parallel with the capacitor 932 and is controlled by a logic 934 dependent on the first end signal S8 and the second end signal S9. According to one example, the logic 934 is configured to close the switch 933 before the first end signal S8 indicates that the end of the first on-time section has been reached. When the first end signal S8 indicates that the end of the first on-time section has been reached, the logic 934 opens the switch 933 in order to generate a ramp of the ramp signal. The ramp signal generator is reset by the second end signal S9, that is, the switch 933 is closed, when the second end signal S9 indicates that the second ramp signal $S_{RAMP2}$ has reached the second reference signal S98, that is, when the second end signal S9 indicates that the end of the second on-time section has been reached.

Figure 26:
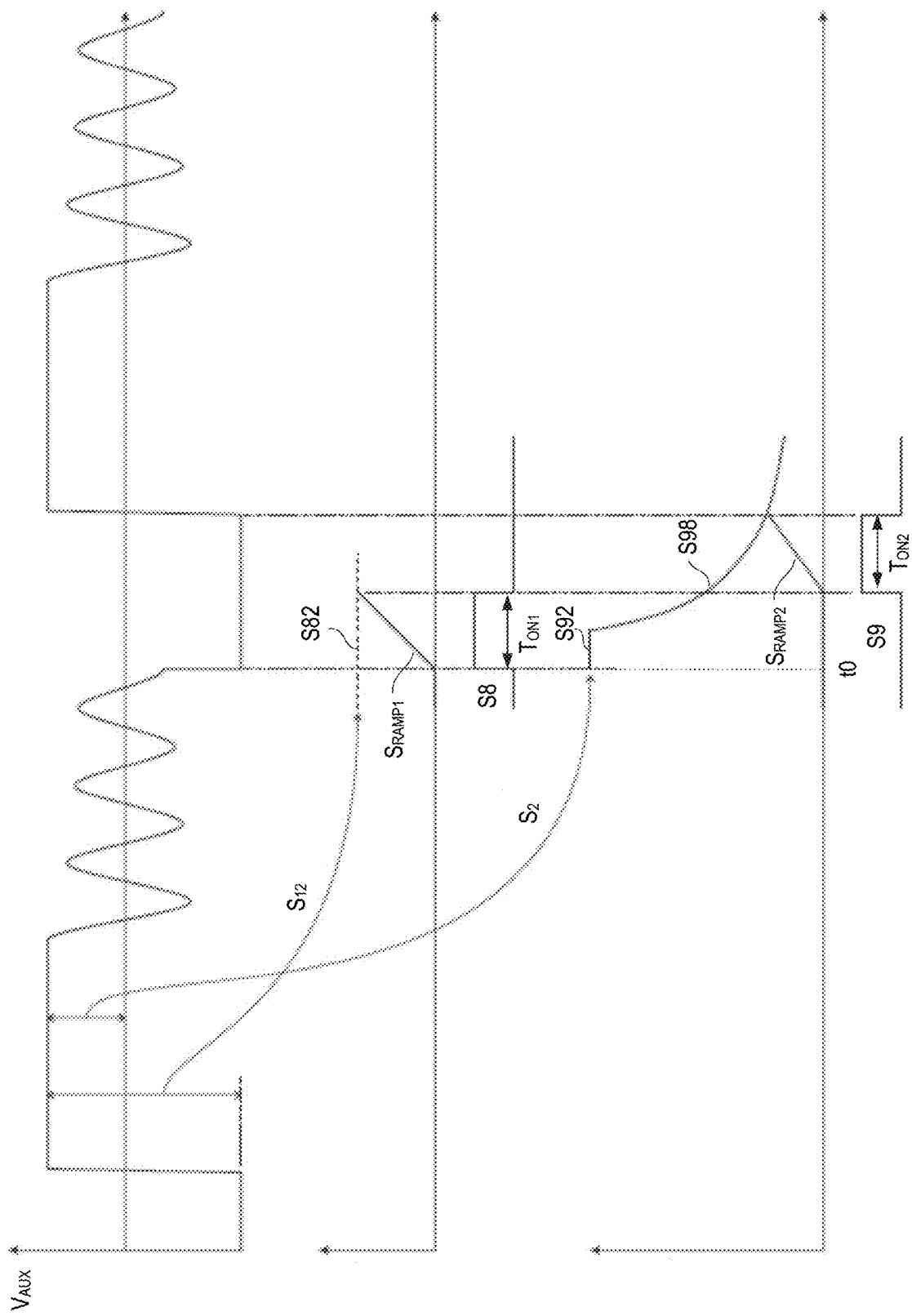
FIG. 26 shows signal diagrams that illustrate the functionality of the control circuit shown in FIG. 19.

The function of the drive circuit 5 with the first and second on-time control circuits 8, 9 is illustrated in FIG. 26. FIG. 26 illustrates signals diagrams of the auxiliary voltage $V_{AUX}$, the reference signals S82, S98 (which are referred to as first and second reference signals in the following) and the first and second ramp signals $S_{RAMP1}$, $S_{RAMP2}$. In particular, FIG. 26 illustrates generating the first and second on-time sections $T_{ON1}$, $T_{ON2}$ of the on-time. As illustrated in FIG. 26, the first reference signal S82 in one drive cycle is dependent on the first measurement signal $S_{12}$ obtained in a previous drive cycle. The "previous drive cycle" can be the drive cycle directly preceding the instantaneous drive cycle. This, however, is only an example. It is also possible, to obtain the first measurement signal $S_{12}$ in one drive cycle and to use this first measurement value $S_{12}$ in two or more subsequent drive cycles. Further, the first measurement signal $S_{12}$ the first measurement signal $S_{12}$ may be generated based on a first measurement value V1 and a second measurement value V2 obtained in different preceding drive cycles.

As can be seen from FIG. 26 and as explained before, the first on-time section $T_{ON1}$ ends when the first ramp signal $S_{RAMP1}$, which starts at the beginning of the instantaneous drive cycle, reaches the first reference signal S82, wherein the first reference signal S82 is proportional to the first measurement signal $S_{12}$ and dependent on the feedback signal $S_{FB}$. The second on-time section $T_{ON2}$ starts when the first on-time section $T_{ON1}$ ends, wherein at the beginning of the second on-time section $T_{ON2}$ the second ramp signal $S_{RAMP2}$ starts. The second reference signal S98 starts at the beginning of the instantaneous drive cycle, wherein, as explained above, a start level is given by the multiplier output signal S92, which is proportional to the second measurement signal S2 and the delay time signal S92 and is dependent on the feedback signal $S_{FB}$. Further, the second reference signal S98 decreases inversely proportional to the time since the beginning of the instantaneous drive cycle. The second on-time section $T_{ON2}$ ends when the second ramp signal S98, which may increase linearly, reaches the second reference signal S98. In this case, a duration of the second on-time section $T_{ON2}$ is proportional to the second measurement signal S2 and the delay time signal S94. Further, the duration of the second on-time section is inversely proportional to the time period since the beginning of the on-time. In this way, the duration of the second on-time section $T_{ON2}$ is dependent on the duration of the first on-time section Tom. Thus, for a given second measurement signal $S_2$ and a given delay time signal S94, the longer the first on-time section $T_{ON1}$ the shorter the second on time section $T_{ON2}$.

Referring to the above, the zero crossing reference signal $S_{ZC\_REF}$ changes in steps of one (1) dependent on the feedback signal $S_{FB}$. Consequently, the delay time signal S94 changes in steps of one dependent on the feedback signal. Such change in the zero crossing reference signal $S_{ZC\_REF}$, however, does not result in an abrupt change of the output power, because such change is considered in the second on-time section $T_{ON2}$. Thus, when the zero crossing reference signal $S_{ZC\_REF}$ increases/decreases the duration of the second on-time section $T_{ON2}$ increases/decreases.

According to one example, generating the zero crossing reference signal $S_{ZC\_REF}$ is synchronized such that the zero crossing reference signal does not change during the delay time $T_{DEL}$. For this synchronization, the zero crossing controller 53 illustrated in FIG. 22 may receive the drive signal $S_{DRV}$. According to one example, the zero crossing reference signal $S_{ZC\_REF}$ is updated based on the feedback signal $S_{FB}$ once in each drive cycle. The zero crossing reference signal $S_{ZC\_REF}$ may be updated, for example, at the beginning of the off-time. Basically, it can be assumed that the zero crossing reference signal $S_{ZC\_REF}$ is constant over several drive cycles. Thus, it is possible to adjust the second on-time section in the instantaneous drive cycle based on the zero crossing reference signal $S_{ZC\_REF}$ used in the previous drive cycle to adjust the delay time or based on the zero crossing reference signal $S_{ZC\_REF}$ that will be used in the instantaneous drive cycle to adjust the delay time.

Figure 27:
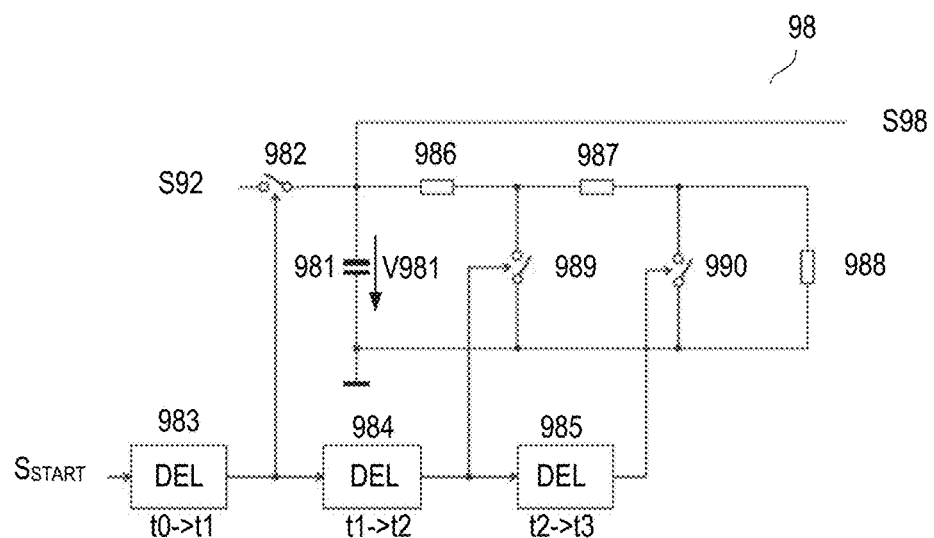
FIG. 27 illustrates one example of a signal generator in the second on-time control circuit shown in FIG. 24.
Figure 28:
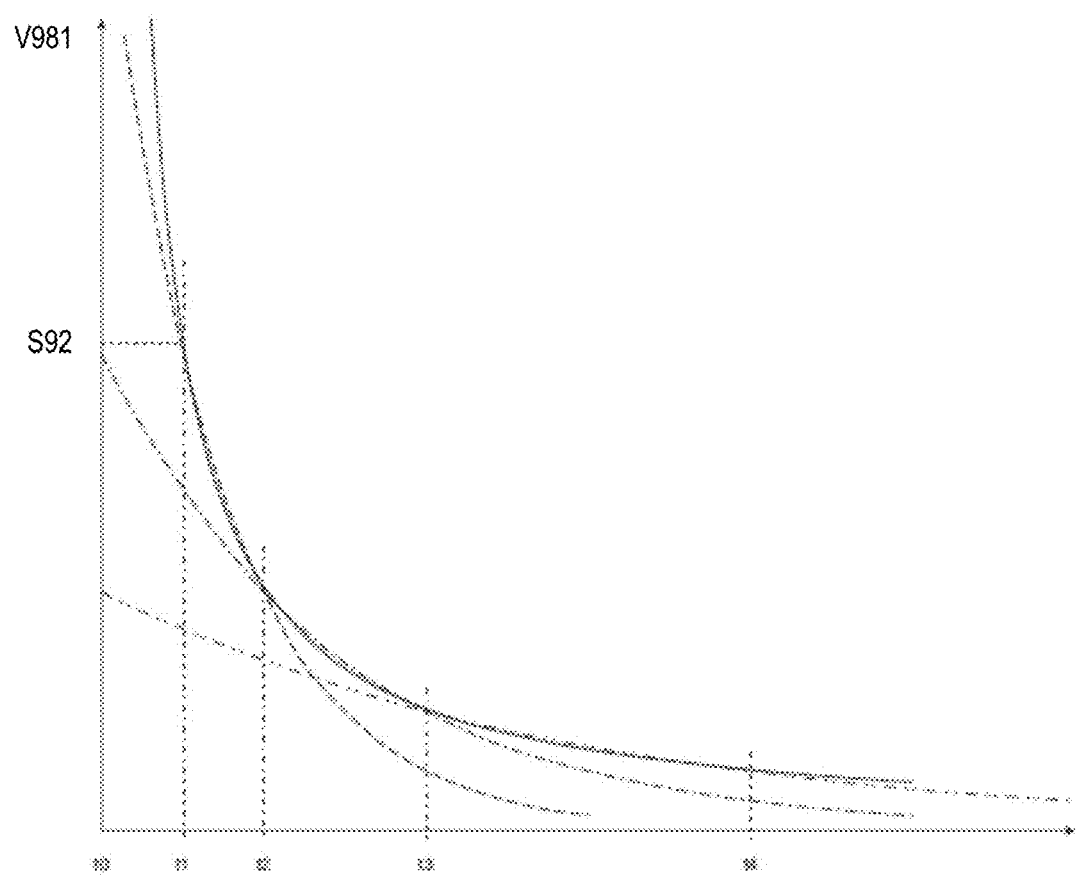
FIG. 28 shows a signal diagram that illustrates the functionality of the signal generator shown in FIG. 27.

On example of the function generator 98 and its functionality are illustrated in FIGS. 27 and 28. This function generator 98 does not exactly output a signal that is inversely proportional to the time since the beginning of the instantaneous drive cycle, but approximates a 1/t function using exponential functions. Referring to FIG. 27, the function generator includes a capacitor 981. This capacitor 981 is charged via an input switch 982 by the signal S92 which is proportional to the delay time and the second measurement signal $S_2$ and which is dependent on the feedback signal $S_{FB}$. This input switch 982 is opened by a first delay element 983 at a first time instance t1. After the first time instance t1, the capacitor 981 is discharged through a resistor network. The capacitor 981 and the resistor network form an RC element, wherein an RC constant of the RC element is increased stepwise over the time so that a discharge rate of the capacitor decreases over the time and the voltage V981 across the capacitor 981 approximates the 1/t function. More specifically, the voltage across the capacitor 981 is approximately proportional to 1/(t−t0), wherein t0 denotes the time instance when the on-time starts. The voltage V981 across the capacitor 981 forms the second reference signal S98 in this example.

In the example illustrated in FIG. 27, the resistor network includes three resistors, a first resistor 986, a second resistor 987, and a third resistor 988 that are connected in series, wherein the series circuit is connected in parallel with the capacitor 981. A first switch 989 is connected in parallel with a series circuit formed by the second and third resistors 987, 988, and second switch 990 is connected in parallel with the third resistor 988.

Before the first time instance t1, the capacitor voltage V981 is maintained at the voltage level defined by the multiplier output signal S92. Each of the input switch 982 and the first and second switches 989, 990 is switched on before the first time instance t1. After the first time instance t1, the capacitor 981 is discharged via the first resistor 986 and the first switch 989, wherein the first switch 989 shorts the second and third resistors 987, 988. At a second time instance t2 the first switch 989 is opened by a second delay element 984, and the capacitor 981 is discharged via the first resistor 986 and the second resistor 987, wherein the second switch 990 shorts the third resistor 988. Finally, at a third time instance t3 the second switch 990 is opened by a third delay element 985, and the capacitor 981 is discharged via the first resistor 986, the second resistor 987, and the third resistor.

In the function generator illustrated in FIG. 28, an 1/t function is approximated using three exponential capacitor discharge functions with different RC time constants such that at least between the first time instance t1 and a fourth time instance the capacitor voltage V981 is approximately proportional to 1/(t−t0). Between the beginning of the on-time at time instance t0 and the first time instance, the capacitor voltage V981 is constant. According to one example, a time period between the beginning of the on-time and the first time instance t1 is shorter than an expected minimum of the duration of the first on-time section.

Referring to the above, the power converter, in the first and second operating mode regulates the output parameter such that it has a predefined level and regulates the input current $I_{IN}$ such that an average waveform of the input current $I_{IN}$ is proportional to the input voltage $V_{IN}$. This is explained with reference to the second operating mode in the following.

In the steady state, the integral of the voltage $V21_1$ across the primary winding $21_1$ over one drive cycle is zero, $$\int_0^T V21_1 dt = 0 \quad (2a).$$

Based on equation (2a), given that the auxiliary voltage $V_{AUX}$ is proportional to the inductor voltage $V21_1$, and considering the waveforms illustrated in FIG. 17 the following relationship applies for the first and second measurement values V1, V2, the on-time duration $T_{ON}$ and the demagnetization duration $T_{DEM}$:

$$V1 \cdot T_{ON} = V2 \cdot T_{DEM} \Rightarrow T_{DEM} = T_{ON} \cdot \frac{V1}{V2}. \quad (3a)$$

Further, a peak $I2_{PK}$ of the inductor current I2 is given by $$I2_{PK} = \frac{V_{IN}}{L} \cdot T_{ON}, \quad (4a)$$

wherein $V_{IN}$ is the input voltage and L is the inductance of the inductor. More specifically, L is the inductance of the primary winding $21_1$ of the transformer 21. Referring to the above, the inductor current I2 equals the input current $I_{IN}$. Further, referring to FIG. 17, the inductor current I2 has a triangular waveform during the on-time. An average $I_{IN\_AVG}$ of the input current $I_{IN}$ is then given by $$I_{IN_{AVG}} = \frac{I2_{PK}}{2} \cdot \frac{T_{ON}}{T} = \frac{V_{IN}}{2 \cdot L} \cdot T_{ON} \cdot \frac{T_{ON}}{T}. \quad (5a)$$

Further, in order to achieve a proportionality between the input voltage $V_{IN}$ and the average input current $I_{IN\_AVG}$, an input impedance of the power converter should be essentially constant at a given power consumption of the load, that is, $$Z_{IN} = \frac{V_{IN}}{I_{IN_{AVG}}} = c, \quad (6a)$$

wherein $Z_{IN}$ denotes the input impedance of the power converter and c is a constant that is dependent on power consumption of the load. Basically, the higher the power consumption of the load, the lower the input impedance $Z_{IN}$. Based on equations (3a), (5a) and (6a), the input impedance can be expressed as $$\begin{aligned} Z_{IN} &= \frac{V_{IN}}{\frac{V_{IN}}{2 \cdot L} \cdot T_{ON} \cdot \frac{T_{ON}}{T}} \\ &= \frac{2 \cdot L}{T_{ON}} \cdot \frac{T}{T_{ON}} \\ &= \frac{2 \cdot L}{T_{ON}} \cdot \frac{T_{ON} + T_{DEM} + T_{DEL}}{T_{ON}} \\ &= \frac{2 \cdot L}{T_{ON}} \cdot \frac{T_{ON} + T_{ON} \cdot \frac{V_1}{V_2} + T_{DEL}}{T_{ON}} \\ &= \frac{2 \cdot L}{T_{ON}} \cdot \left(1 + \frac{V_1}{V_2} + \frac{T_{DEL}}{T_{ON}}\right) \\ &= \frac{2 \cdot L}{T_{ON}} \cdot \frac{1}{V2} \left(V2 + V1 + V2 \cdot \frac{T_{DEL}}{T_{ON}}\right). \end{aligned} \quad (7a)$$

Based on equation (7a), the desired duration $T_{ON}$ of the on-time can be expressed as $$T_{ON} = \frac{2 \cdot L}{Z_{IN} \cdot V2} \cdot \left(V2 + V1 + V2 \frac{T_{DEL}}{T_{ON}}\right). \quad (8a)$$

In the second operating mode explained above, adjusting the duration $T_{ON}$ of the on-time in accordance with equation (8a) is achieved by having the first on-time section and the second on-time section. Referring to the above, the duration $T_{ON1}$ of the first on-time section is proportional to the sum V1+V2 of the first and second measurement values V1, V2. In the first on-time controllers 8 illustrated in FIGS. 8, 10 and 11 the first measurement signal S12 that is used to adjust the duration $T_{ON1}$ of the first on-time section represents the sum V1+V2 of the first and second measurement values V1, V2. In equation (8a), the term V1+V2 represents the first on-time section.

Referring to the above, the duration $T_{ON2}$ of the second on-time section is proportional to the second measurement value V2 and the delay time $T_{DEL}$ and inversely proportional to the duration since the beginning of the on-time, that is inversely proportional to the duration $T_{ON}$ of the on-time. In the second on-time controller 9 illustrated in FIG. 24, the second measurement signal $S_2$ represents the second measurement value V2 and the delay time signal S94 represents the delay time $T_{DEL}$. Further, the signal value of the function generator signal S98 is proportional to the second measurement signal $S_2$ and the delay time signal S94, so that duration $T_{ON2}$ of the second on-time section is proportional to the delay time $T_{DEL}$ and the second measurement value V2. Further, the function generator output signal S98 is inversely proportional to the time that has elapsed since the beginning of the on-time, so that the duration of the second on-time section is proportional to the duration of the (instantaneous) on-time. In equation (8a), the term $$V2 \cdot \frac{T_{DEL}}{T_{ON}}$$

represents the second on-time section.

Referring to the above, each of the first on-time section and the second on-time section is dependent on the feedback signal $S_{FB}$ in the same way. This feedback signal $S_{FB}$ is represented by the term $$\frac{2 \cdot L}{Z_{IN} \cdot V2}$$

in equation (8a).

Referring to equation (8a), when $T_{DEL}$ is short relative to the duration of the on-time, the on-time is approximately given by $$T_{ON} = \frac{2 \cdot L}{Z_{IN} \cdot V2} \cdot (V2 + V1), \quad (9a)$$

which represents operating the power converter in the first operating mode.

Figure 29:
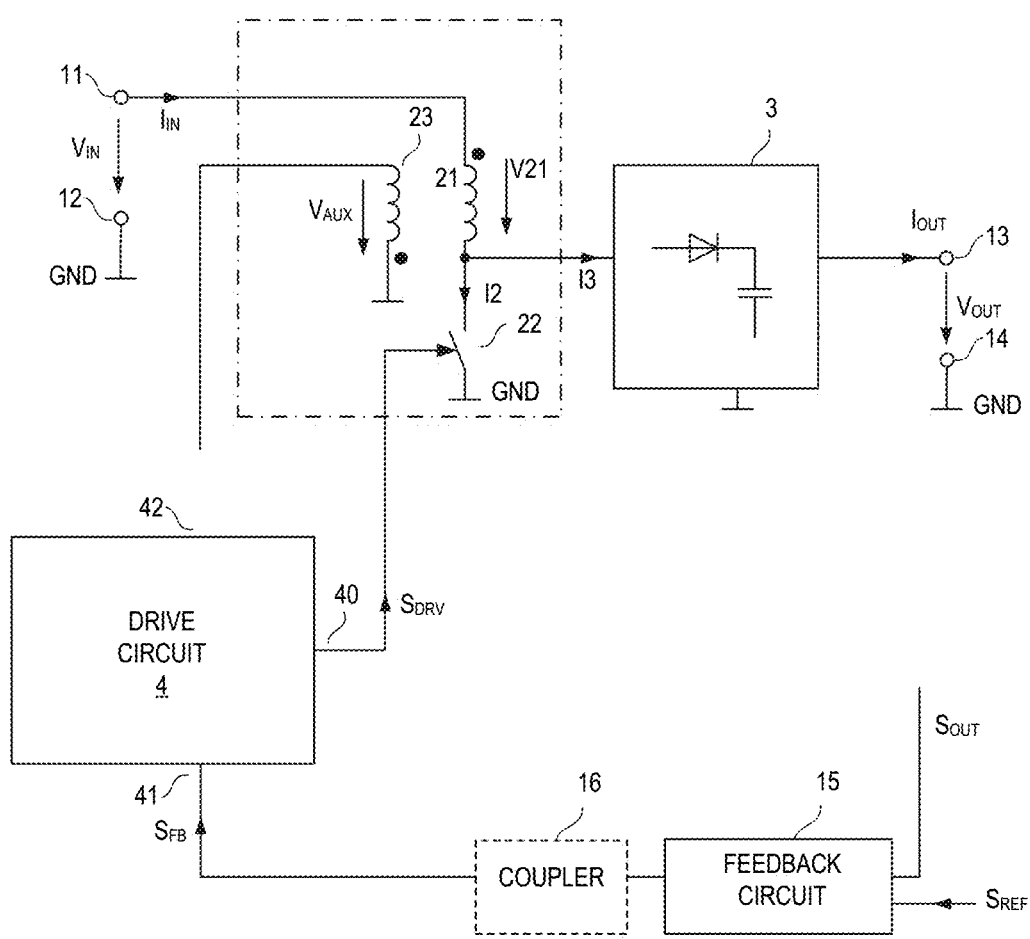
FIG. 29 illustrates a power converter according to another example.

Although operating a power converter in a first operating mode and a second operating mode has been explained with reference to a flyback converter, this is only an example. These operating methods are not restricted to be used in a flyback converter, but may be used in other types of power converters, such as a boost converter as well. An example of a boost converter is illustrated in FIG. 29.

While the inductor 21 in the flyback converter is a transformer, the inductor 21 in the boost converter is a choke, for example, and is connected in series with the switch 22, wherein the series circuit including the inductor 21 and the electronic switch 22 is connected to the input 11, 12. The rectifier circuit 3 is connected between a circuit node at which the inductor 21 and the switch 22 are connected and the output 13, 14. In this type of power converter, the input voltage $V_{IN}$ and the output voltage $V_{OUT}$ may be referenced to the same potential. Thus, the coupler 16 may be omitted.

The auxiliary winding 23 is inductively coupled to the inductor 21, and the auxiliary voltage $V_{AUX}$ is proportional to a voltage V21 across the inductor 21.

Like operating the electronic switch in the flyback converter, operating the electronic switch 22 in a switched-mode fashion includes operating the electronic switch 22 in a plurality of successive drive cycles, wherein in each of these drive cycles the electronic switch 22 switches on for an on-time and switches off for an off-time. Signal diagrams that correspond to the signal diagrams shown in FIG. 17, but apply to a boost converter are illustrated in FIG. 30.

Figure 30:
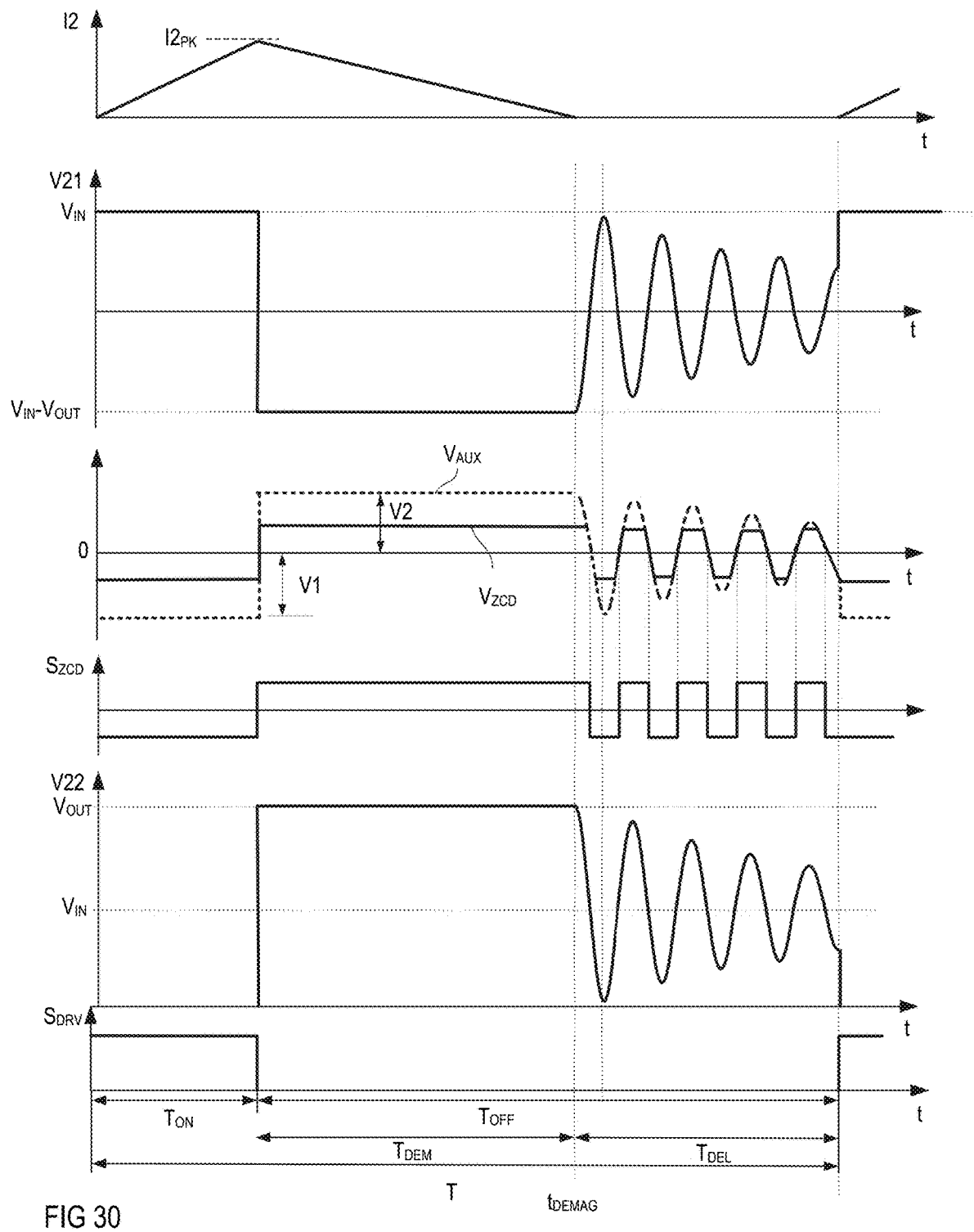
FIG. 30 shows signal diagrams that illustrate operating the power converter shown in FIG. 29 in a second operating mode.

As can be seen from FIG. 30, operating the boost converter in successive drive cycles is very similar to operating the flyback converter in successive drive cycles. During the on-time, the inductor current I2 decreases and the inductor 21 is magnetized. During the off-time, the inductor 21 is demagnetized, and parasitic oscillations occur during the delay time between the end of the demagnetization period and the start of a new drive cycle. Differences between operating the boost converter and operating the flyback converter are: (a) in the boost converter, the inductor current decreases over the demagnetization period $T_{DEM}$; (b) the inductor voltage V21, during the demagnetization period $T_{DEM}$, is essentially given by the input voltage $V_{IN}$ minus the output voltage $V_{OUT}$; and the switch voltage V22 during the demagnetization period $T_{DEM}$ essentially equals the output voltage $V_{OUT}$. Nevertheless, the boost converter can be operated in the first and second operating mode in the same way as the flyback converter explained above. This can be seen from equations (2b)-(8b) below. These equations correspond to equations (2a)-(8a), but apply to the boost converter.

In the steady state, the integral of the voltage V21 across the inductor over one drive cycle is zero, $$\int_0^T V21 dt = 0 \quad (2b).$$

Based on equation (2b), given that the auxiliary voltage $V_{AUX}$ is proportional to the inductor voltage V21, and considering the waveforms illustrated in FIG. 30 the following relationship applies for the first and second measurement values V1, V2, the on-time duration $T_{ON}$ and the demagnetization duration $T_{DEM}$:

$$V1 \cdot T_{ON} = V2 \cdot T_{DEM} => T_{DEM} = T_{ON} \cdot \frac{V1}{V2}. \quad (3b)$$

Further, a peak $I2_{PK}$ of the inductor current I2 is given by $$I2_{PK} = \frac{V_{IN}}{L} \cdot T_{ON}, \quad (4b)$$

wherein $V_{IN}$ is the input voltage and L is the inductance of the inductor 21. The inductor current I2 equals the input current $I_{IN}$. Further, referring to FIG. 30, the inductor current I2 has a triangular waveform during the on-time $T_{ON}$ and the demagnetization time $T_{DEM}$. An average $I_{IN\_AVG}$ of the input current $I_{IN}$ is then given by $$I_{IN_{AVG}} = \frac{I2_{PK}}{2} \cdot \frac{T_{ON} + T_{DEM}}{T} = \frac{V_{IN}}{2 \cdot L} \cdot T_{ON} \cdot \frac{T_{ON} + T_{DEM}}{T}. \quad (5b)$$

Further, in order to achieve a proportionality between the input voltage $V_{IN}$ and the average input current $I_{IN\_AVG}$, an input impedance of the power converter should be essentially constant at a given power consumption of the load, that is, $$Z_{IN} = \frac{V_{IN}}{I_{IN_{AVG}}} = c, \quad (6b)$$

wherein $Z_{IN}$ denotes the input impedance of the power converter and c is constant that is dependent on power consumption of the load. Basically, the higher the power consumption of the load, the lower the input impedance $Z_{IN}$. Based on equations (3b), (5b) and (6b), the input impedance can be expressed as $$Z_{IN} = \frac{V_{IN}}{\frac{V_{IN}}{2 \cdot L} \cdot T_{ON} \cdot \frac{T_{ON} + T_{DEM}}{T}} \quad (7b)$$

$$= \frac{2 \cdot L}{T_{ON}} \cdot \frac{T}{T_{ON} + T_{DEM}}$$

$$= \frac{2 \cdot L}{T_{ON}} \cdot \frac{T_{ON} + T_{DEM} + T_{DEL}}{T_{ON} + T_{DEM}}$$

$$= \frac{2 \cdot L}{T_{ON}} \cdot \frac{T_{ON} \cdot \left(1 + \frac{V_1}{V_2}\right) + T_{DEL}}{T_{ON} \cdot \left(1 + \frac{V_1}{V_2}\right)}$$

$$= \frac{2 \cdot L}{T_{ON}} \cdot \frac{T_{ON} \cdot (V_2 + V_1) + T_{DEL} \cdot V2}{T_{ON} \cdot (V_2 + V1)}.$$

Based on equation (7b), the desired duration $T_{ON}$ of the on-time can be expressed as $$T_{ON} = \frac{2 \cdot L}{Z_{IN}} \cdot \frac{1}{V1 + V2} \left( V2 + V1 + V2 \cdot \frac{T_{DEL}}{T_{ON}} \right). \quad (8b)$$

The term in brackets is the same as in equation (8a) so that the first and second on-time sections in the boost converter can be adjusted in the same way as in the flyback converter. Just the term $$\frac{2 \cdot L}{Z_{IN}} \cdot \frac{1}{V1 + V2}$$

in equation (8b), that affects both the first and the second on-time section is different from the corresponding term $$\frac{2 L}{Z_{IN}} \cdot \frac{1}{V2}$$

in equation (8a) in that there is an inverse proportionality to V1+V2 instead of only V2. This is due to the different topologies of the flyback converter and the boost converter. The term $$\frac{2 \cdot L}{Z_{IN}} \cdot \frac{1}{V1 + v2}$$

in equation (6b) represents the feedback signal $S_{FB}$.

The invention claimed is:

1. A method comprising:
   driving an electronic switch, the switch coupled to an inductor in a power converter, the electronic switch driven during successive drive cycles, each of which includes an on-time and an off-time of controlling the switch;
   wherein driving the electronic switch comprises:
   measuring an inductor voltage during the on-time in a first drive cycle in order to obtain a first measurement value;
   measuring the inductor voltage during the off-time in a first drive cycle in order to obtain a second measurement value;
   obtaining a first voltage measurement signal, the first voltage measurement signal being dependent on a sum of the first measurement value and the second measurement value; and
   adjusting the on-time of the switch in a second drive cycle depending on a feedback signal and the first voltage measurement signal, the second drive cycle occurring subsequent to the first drive cycle;
   wherein adjusting the on-time depending on the feedback signal and the first voltage measurement signal comprises:
   adjusting a first on-time portion, $T_{ON1}$, the first on-time portion adjusted depending on the feedback signal and the first voltage measurement signal, and
   adjusting a second on-time portion, $T_{ON2}$, the second on-time portion occurring subsequent to the first on-time portion,
   wherein adjusting the second on-time portion comprises:
   obtaining a second voltage measurement signal that is dependent on the second measurement value;
   obtaining a delay time between a demagnetization time instance in a drive cycle and the end of the drive cycle;
   adjusting a duration of the second on-time portion based on the feedback signal; and
   adjusting the second on-time portion such that a duration of the second on-time portion is: i) substantially proportional to the second voltage measurement signal, ii) substantially proportional to the delay time, and iii) substantially inversely proportional to a time duration since a beginning of the on-time.

2. The method of claim 1, wherein measuring the inductor voltage during the on-time and the off-time comprises measuring a magnitude of the inductor voltage, each of the first measurement value and the second measurement values representing a magnitude of the inductor voltage.

3. The method of claim 1, wherein measuring the inductor voltage comprises measuring an auxiliary voltage across an auxiliary winding coupled to the inductor.

4. The method of claim 1, wherein adjusting the second on-time portion comprises:
   generating a reference signal, the reference voltage being proportional to the duration of the delay time and proportional to the second voltage measurement signal, the reference signal decreasing inversely proportional to a time duration since the beginning of the on-time;

generating a ramp signal at the beginning of the second on-time portion;

comparing the ramp signal to the reference signal; and ending the second on-time portion in response to detecting the ramp signal crossing the reference signal.

5. The method of claim 4, wherein generating the reference signal comprises charging a capacitor before the on-time and discharging the capacitor via a resistor network during the on-time.

6. The method of claim 1, wherein the second on-time portion starts when the first on-time portion ends, and wherein the on-time ends when the second on-time portion ends.

7. The method of claim 1, wherein driving the electronic switch in a drive cycle comprises detecting zero crossings of the auxiliary voltage and ending the drive cycle after a predefined number of zero crossings has occurred, wherein the predefined number of zero crossings is dependent on the feedback signal, and wherein obtaining the duration of the delay time comprises obtaining the predefined number.

8. The method of claim 7 further comprising:

providing a zero crossing detection voltage by a voltage limiter based on the auxiliary voltage, wherein detecting the zero crossings of the auxiliary voltage comprises detecting zero crossings of the zero crossing detection voltage.

9. The method of claim 8, wherein measuring the auxiliary voltage comprises measuring an auxiliary current through the voltage limiter.

10. The method of claim 1, wherein the power converter is a flyback converter.

11. The method of claim 1, wherein the first measurement value and the second measurement value are measured during the on-time and the off-time of the same drive cycle.

12. A control circuit operative to drive an electronic switch coupled to an inductor in a power converter in successive drive cycles, each of the cycles including an on-time and an off-time, wherein the control circuit is operative:

to measure an auxiliary voltage across an auxiliary winding coupled to the inductor during the on-time of a drive cycle in order to obtain a first measurement value;

to measure the auxiliary voltage during the off-time of a drive cycle in order to obtain a second measurement value;

to obtain a first voltage measurement signal that is dependent on a sum of the first measurement value and the second measurement value; and to adjust the on-time in a second drive cycle dependent on a feedback signal and the first voltage measurement signal wherein to adjust the on-time dependent on the feedback signal and the first voltage measurement signal comprises:

to adjust a first on-time portion dependent on the feedback signal and the first voltage measurement signal, and to adjust a second on-time portion following the first on-time portion wherein to adjust the second on-time portion comprises:

to obtain a second voltage measurement signal that is dependent on the second measurement value;

to obtain a delay time between a demagnetization time instance in a drive cycle and the end of the drive cycle;

to adjust a duration of the second on-time portion based on the feedback signal; and to adjust the second on-time portion such that a duration of the second on-time portion is at least approximately proportional to the second voltage measurement signal, at least approximately proportional to the delay time, and at least approximately inversely proportional to a time duration since a beginning of the on-time.

13. A power converter comprising:

an electronic switch coupled to an inductor; and a control circuit according to claim 12 configured to drive the electronic switch.

\* \* \* \* \*